US009209999B2

(12) United States Patent
Shi

(10) Patent No.: US 9,209,999 B2
(45) Date of Patent: Dec. 8, 2015

(54) METHOD, APPARATUS, AND SYSTEM FOR ASSOCIATING SESSIONS

(71) Applicant: Huawei Technologies Co., Ltd., Shenzhen, Guangdong (CN)

(72) Inventor: Xiaoyan Shi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 264 days.

(21) Appl. No.: 13/661,653

(22) Filed: Oct. 26, 2012

(65) Prior Publication Data

US 2013/0052995 A1 Feb. 28, 2013

Related U.S. Application Data

(63) Continuation of application No. PCT/CN2010/000585, filed on Apr. 29, 2010.

(51) Int. Cl.
*H04L 12/66* (2006.01)
*H04L 12/64* (2006.01)
*H04L 29/12* (2006.01)

(52) U.S. Cl.
CPC ............ *H04L 12/66* (2013.01); *H04L 12/6418* (2013.01); *H04L 61/203* (2013.01); *H04L 61/2015* (2013.01)

(58) Field of Classification Search
CPC . H04L 12/66; H04L 12/6418; H04L 61/2015; H04L 61/203
USPC ............................ 370/230, 331; 709/245, 227
See application file for complete search history.

(56) References Cited

U.S. PATENT DOCUMENTS

| 7,330,453 B1 | 2/2008 | Borella et al. |
| 7,584,262 B1 | 9/2009 | Wang et al. |

(Continued)

FOREIGN PATENT DOCUMENTS

| CN | 1984021 A | 6/2007 |
| CN | 101064938 A | 10/2007 |

(Continued)

OTHER PUBLICATIONS

"TS 23.402—$3^{rd}$ Generation Partnership Project; Technical Specification Group Services and System Aspects; Architecture Enhancements for Non-3GPP Accesses (Release 9)," 3GPP Technical Specification, Mar. 2010, V9.4.0, 3GPP Valbonne, France.

(Continued)

*Primary Examiner* — Chandrahas Patel
(74) *Attorney, Agent, or Firm* — Leydig, Voit & Mayer, Ltd.

(57) ABSTRACT

Embodiments of the present invention provide a method, an apparatus, and a system for associating sessions, which relate to the communications technology field, and are used to solve the problem where policy control sessions cannot be correctly associated when an access network is connected to a core network through a secure gateway ePDG. The method for associating sessions in an embodiment of the present invention includes: receiving a first policy control session establishment request or a first policy control session modification request that carries a local address of a user equipment; and associating the first policy control session and a second policy control session corresponding to the first policy control session according to the local address of the user equipment; where, the local address is allocated by a non-3GPP access network.

9 Claims, 14 Drawing Sheets

(56) References Cited

U.S. PATENT DOCUMENTS

| | | | |
|---|---|---|---|
| 7,890,657 B2 * | 2/2011 | MacDonald et al. | 709/245 |
| 8,582,480 B2 * | 11/2013 | Jin et al. | 370/310 |
| 8,799,440 B2 * | 8/2014 | Zhou et al. | 709/223 |
| 8,891,432 B2 * | 11/2014 | Aso et al. | 370/315 |
| 2009/0017826 A1 | 1/2009 | Shaheen | |

FOREIGN PATENT DOCUMENTS

| | | |
|---|---|---|
| CN | 101150782 A | 3/2008 |
| CN | 101159563 A | 4/2008 |
| CN | 101350728 A | 1/2009 |
| CN | 101588326 A | 11/2009 |
| EP | 2146458 A1 | 1/2010 |
| WO | WO 2010034483 A1 | 4/2010 |

OTHER PUBLICATIONS

"TS 29.213—3$^{rd}$ Generation Partnership Project; Technical Specification Group Core Network and Terminals; Policy and Charging Control Signaling Flows and Quality of Service (QoS) Parameter Mapping (Release 9)," 3GPP Technical Specification, Mar. 2010, V9.2.0, 3GPP, Valbonne, France.

International Search Report in corresponding International Patent Application No. PCT/CN2010/000585 (Feb. 17, 2011).

Written Opinion of the International Searching Authority in corresponding International Patent Application No. PCT/CN2010/000585 (Feb. 17, 2011).

Extended European Search report in corresponding European Patent Application No. 10850435.8 (Dec. 24, 2012).

* cited by examiner

METHOD, APPARATUS, AND SYSTEM FOR ASSOCIATING SESSIONS

CROSS-REFERENCE TO RELATED APPLICATIONS

This application is a continuation of International Patent Application No. PCT/CN2010/000585, filed on Apr. 29, 2010.

FIELD OF THE INVENTION

The present invention relates to the communications technology field, and in particular, to a method, an apparatus, and a system for associating sessions.

BACKGROUND OF THE INVENTION

In the existing EPC (Evolved Packet Core) architecture, a UE (User Equipment) may be connected to the EPC through a non-3GPP (3rd Generation Partnership Project) access network. Multiple PDN (Packet Data Network) connections exist between a non-3GPP access network and a PGW (PDN Gateway, packet data network gateway). Accordingly, multiple gateway control sessions will be established between the non-3GPP access network and a PCRF (Policy Control and Charging Rules Function), and multiple IP-CAN (IP Connectivity Access Network) sessions will be established between the PGW and the PCRF. In order that the PCRF may provide correct QoS (Quality of Service) rules to the non-3GPP access network, the PCRF needs to associate corresponding gateway control sessions and IP-CAN sessions.

Currently, the procedure for associating, by the PCRF, gateway control sessions and IP-CAN sessions may be implemented by using the following methods:

1) Match an IP-CAN session and a gateway control session according to an HoA address (Home Address) or a CoA address (Care-of Address) provided by the IP-CAN session and IP addresses provided by the gateway control session. Specifically, if there is an IP address that is the same as the HoA address or CoA address among at least one IP address provided by the gateway control session, the PCRF may associate the IP-CAN session and the gateway control session according to the same IP address.

2) Match an IP-CAN session and a gateway control session according to PDN identities and subscriber identities in the IP-CAN session and the gateway control session. Specifically, if the IP-CAN session and the gateway control session carry the same PDN identities and subscriber identities, the PCRF may associate the IP-CAN session and the gateway control session.

When an EPC is connected through an untrusted non-3GPP access network, to ensure security of the EPC, a security gateway, for example, ePDG (evolved Packet Data Gateway) needs to be established between the untrusted non-3GPP access network and the EPC; the untrusted non-3GPP access network allocates a local address IP_Local to a UE, and then the UE uses IP_LOCAL to establish a secure tunnel with the ePDG. The gateway control session may be initiated by the untrusted non-3GPP access network, or may be initiated by the ePDG.

When implementing association of the gateway control session and IP-CAN session, the inventor finds at least the following problem in the prior art:

A gateway control session initiated by an untrusted non-3GPP access network cannot be associated with an IP-CAN session.

The gateway control session and the IP-CAN session involved in the preceding description are both used to acquire policy control rules. Therefore, the gateway control session and the IP-CAN session should belong to the policy control sessions. That is, when a policy control session initiated by an untrusted non-3GPP access network lacks information such as an HoA/CoA address and a PDN identity, it is hard to be associated with other policy control sessions.

SUMMARY OF THE INVENTION

Embodiments of the present invention provide a method, an apparatus, and a system for associating sessions, to solve the problem where policy control sessions cannot be correctly associated when an access network is connected to a core network through a secure gateway ePDG.

To meet the preceding purpose, embodiments of the present invention use the following technical solutions:

A method for associating sessions is provided, including:
receiving a first policy control session establishment request that carries a local address of a user equipment or a first policy control session modification request that carries a local address of a user equipment; and
associating the first policy control session and a second policy control session corresponding to the first policy control session according to the local address of the user equipment;
where, the local address is allocated by a non-third generation partnership project 3GPP access network.

An apparatus for associating sessions is provided, including:
a receiving module, configured to receive a first policy control session establishment request or a first policy control session modification request that carries a local address of a user equipment; and
an associating module, configured to associate the first policy control session and a second policy control session corresponding to the first policy control session according to the local address of the user equipment;
where, the local address is allocated by a non-third generation partnership project 3GPP access network.

A system for associating sessions is provided, including a policy control and charging rules function PCRF; where,
the PCRF is configured to receive a first policy control session establishment request that carries a local address of a user equipment or a first policy control session modification request that carries a local address of a user equipment, and associate the first policy control session and a second policy control session corresponding to the first policy control session according to the local address of the user equipment;
where, the local address is allocated by a non-third generation partnership project 3GPP access network.

A system for associating sessions is provided, including a non-third generation partnership project 3GPP access network, where the non-3GPP access network includes a policy controller PC; where,
the PC is configured to receive an S9* session establishment request that carries a local address of a user equipment, and associates the S9* session and a remote authentication dial-in user service RADIUS session or a diameter session corresponding to the first policy control session according to the local address of the user equipment;
where, the local address is allocated by a non-third generation partnership project 3GPP access network.

According to the method, apparatus, and system for associating sessions provided in the embodiments of the present invention, the local address of the user equipment is carried in the policy control session, so that different policy control sessions of a same user equipment may be associated according to the local address to ensure that the service policies followed by different sessions of the same user equipment are consistent. The solutions provided in the embodiments of the present invention may implement correct association between different policy control sessions but do not rely on information of the user equipment such as an HoA/CoA address or a PDN identity when an access network is connected to a core network through a secure gateway ePDG according to the local address of the user equipment.

BRIEF DESCRIPTION OF THE DRAWINGS

For a better understanding of the technical solutions in the embodiments of the present invention, the accompanying drawings for illustrating the embodiments are briefly described below. Apparently, the accompanying drawings in the following description illustrate only some embodiments of the present invention, and a person skilled in the art may derive other accompanying drawings from these accompanying drawings without creative efforts.

DETAILED DESCRIPTION OF THE EMBODIMENTS

The technical solution under the present invention is described below with reference to the accompanying drawings. Apparently, the embodiments described below are for the exemplary purpose only, without covering all embodiments of the present invention. All other embodiments obtained by a person skilled in the art based on the embodiments given herein without making any creative effort are covered in the protection scope of the present invention.

The following describes in detail the method, apparatus, and system for associating sessions provided in the embodiments of the present invention with reference to the drawings.

In the scenario where an EPC is connected through an untrusted non-3GPP access network, the untrusted non-3GPP access network may only know an outer layer address of a secure tunnel, that is, a local address IP_LOCAL of the UE, but cannot know an inner layer address (for example, HoA or CoA) and a PDN identity of the secure tunnel. When the untrusted non-3GPP access network initiates a gateway control session, the gateway control session cannot carry an HoA/CoA address or a PDN identity that matches an IP-CAN session. As a result, the gateway control session initiated by the untrusted non-3GPP access network cannot be associated with the IP-CAN session.

Embodiment 1

Figure 1:
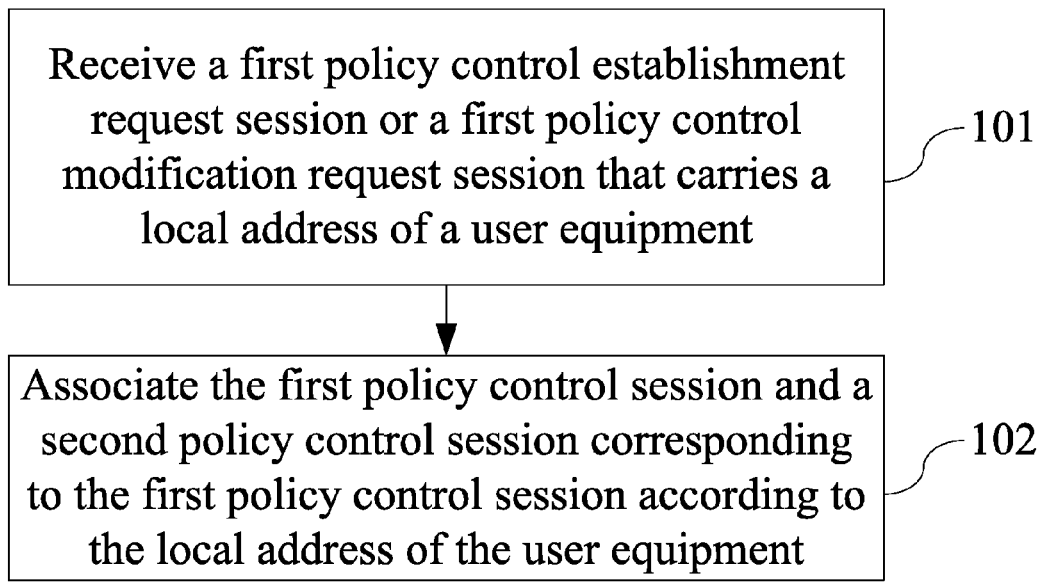
FIG. 1 is a flow chart of a method for associating sessions according to a first embodiment of the present invention.
Figure 2:
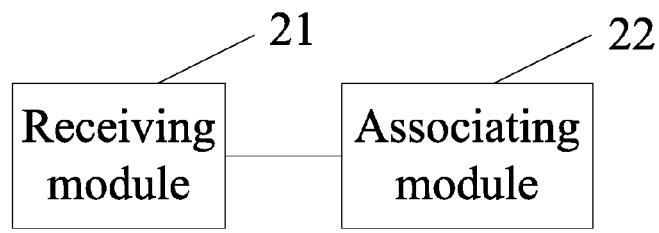
FIG. 2 is a structural schematic diagram of an apparatus for associating sessions according to the first embodiment of the present invention.

As shown in FIG. 1, a method for associating sessions provided in this embodiment includes the following:

101: Receive a first policy control session establishment request or a first policy control session modification request that carries a local address of a user equipment; where, the local address of the user equipment is allocated by a non-third generation partnership project 3GPP access network.

The local address of the user equipment is carried in the first policy control session establishment request or the first policy control session modification request. Therefore, during subsequent association of different sessions, the local address of the user equipment may be used as the basis for association.

In addition, in this embodiment and subsequent embodiments, the local address may be but is not limited to an IP address or an IP address prefix allocated by a non-3GPP access network to a user equipment.

102: Associate the first policy control session and a second policy control session corresponding to the first policy control session according to the local address of the user equipment.

The second policy control session may be a gateway control session initiated by an untrusted non-3GPP access network. Generally, it is difficult for an untrusted non-3GPP access network to acquire information such as an HoA/CoA address or a PDN identity corresponding to a user equipment. Therefore, a gateway control session initiated by an untrusted non-3GPP access network generally carries a local address of the user equipment to identify the user equipment corresponding to the current session, facilitating association of the first policy control session and the second policy control session according to the local address.

In this embodiment, the execution subject for each of the preceding steps may be a policy control and charging rules function (PCRF), or a policy controller (PC). The first policy control session and the second policy control session also vary with different execution subjects.

For example, when the execution subject is a PCRF, the first policy control session may be an IP-CAN session, whereas the second policy control session may be a gateway control session; or, the first policy control session may be a first gateway control session initiated by an ePDG, whereas the second policy control session may be a second gateway control session initiated by a non-3GPP access network. If the execution subject is a PC, the first policy control session may be an S9* session initiated by a PCRF, whereas the second policy control session may be a RADIUS (Remote Authentication Dial-In User Service) or a Diameter session initiated by a BRAS (Broadband Remote Access Server). The specific implementation is described in subsequent embodiments, and is not described in this embodiment.

The S9* session mentioned in this embodiment indicates a policy session between a non-3GPP access network policy controller and a 3GPP access network policy controller. It may also be described by using other names, such as an S9 session and an Sx session. The present invention does not restrict its name.

The non-3GPP access network policy controller may be an RACS (Resource and Admission Control Subsystem), a BPCF (Broadband Policy Control Framework), a PDP (Policy Decision Point), or a policy controller PC, and so on.

Corresponding to the preceding method for associating sessions, this embodiment further provides an apparatus for associating sessions, including:

a receiving module 21, configured to receive a first policy control session establishment request or a first policy control session modification request that carries a local address of a user equipment; where, the local address may be but is not limited to an IP address or an IP address prefix allocated by a non-3GPP access network to a user equipment; and an associating module 22, configured to associate the first policy control session and a second policy control session corresponding to the first policy control session according to the local address of the user equipment.

In this embodiment, the apparatus for associating sessions may be a policy control and charging rules function (PCRF), or a policy controller PC, or a functional module integrated on the PCRF or PC.

According to the method and apparatus for associating sessions provided in the embodiments of the present invention, the local address of the user equipment is carried in the policy control session, so that different policy control sessions of a same user equipment may be associated according to the local address to ensure that the service policies followed by different sessions of the same user equipment are consistent. The solution provided in the embodiment of the present invention may implement correct association between different policy control sessions but do not rely on information of the user equipment such as an HoA/CoA address or a PDN identity when an access network is connected to a core network through a secure gateway ePDG according to the local address of the user equipment.

Embodiment 2

The following describes the method for associating sessions provided in this embodiment with a specific scenario. Specifically, the method for associating sessions provided in this embodiment may be applicable to the following scenario: A user equipment (UE) accesses a network through an untrusted non-3GPP access network, and a proxy mobile IP or GTP (GPRS (General Packet Radio Service) Tunneling Protocol) message is used between a secure gateway ePDG and a PGW.

Figure 3:
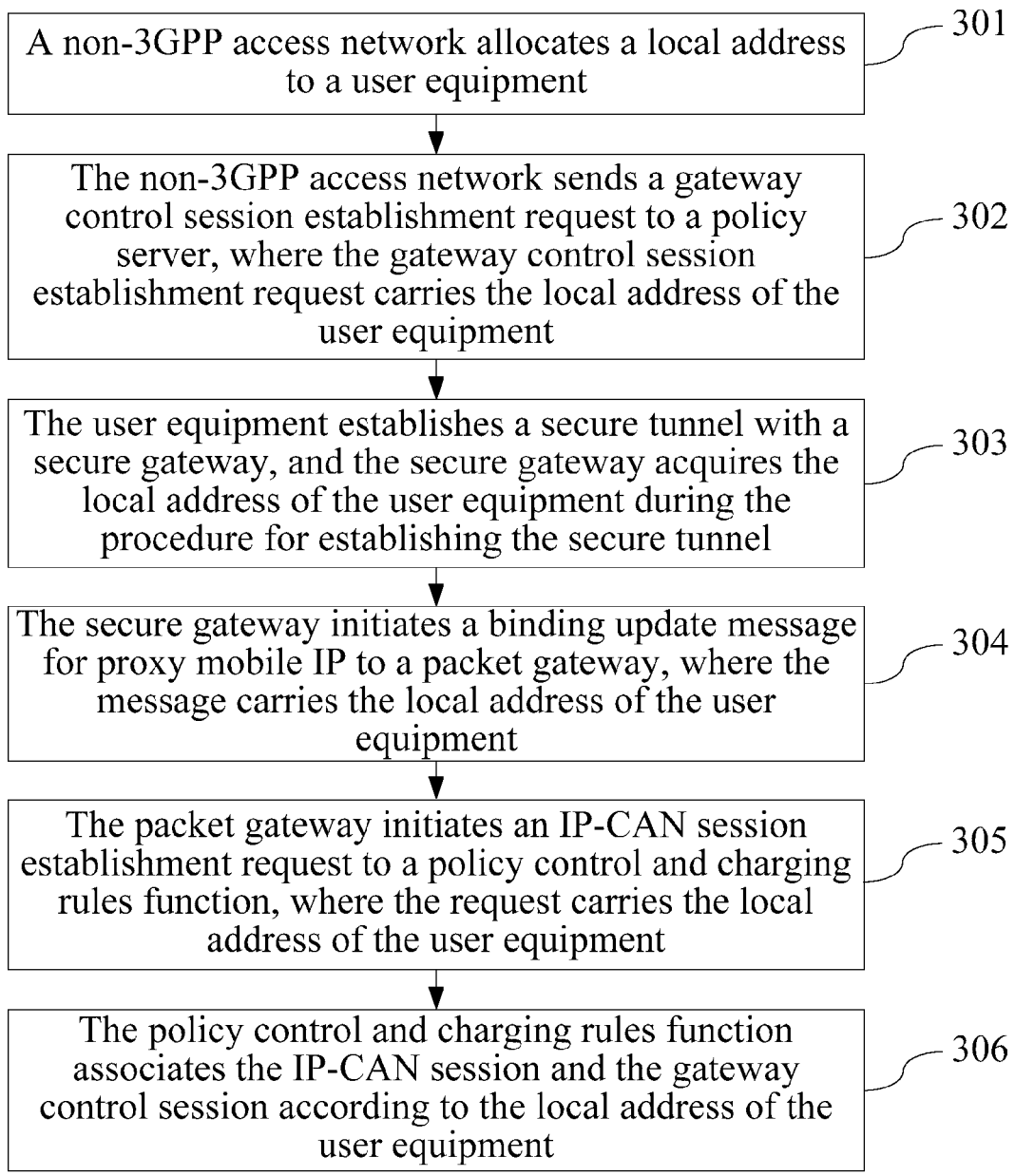
FIG. 3 is a flow chart of a method for associating sessions according to a second embodiment of the present invention.

In this embodiment, as shown in FIG. 3, the method for associating sessions specifically includes the following steps:

301: A non-3GPP access network allocates a local address (IP_Local) to a UE.

Specifically, the procedure for allocating, by the non-3GPP access network, the local address to the UE may be but is not limited to allocating an address through DHCP (Dynamic Host Configuration Protocol, dynamic host configuration protocol), or PPP (Point to Point Protocol, point to point protocol), or other address allocation methods specific to access technologies.

302: The non-3GPP access network sends a gateway control session establishment request to a policy server PCRF, where the gateway control session establishment request carries the local address of the UE.

303: The UE establishes a secure tunnel with a secure gateway ePDG, and the ePDG acquires the local address of the UE during the procedure for establishing the secure tunnel.

The secure tunnel may be established through, but not limited to, an Internet key exchange protocol (IKEv2). Certainly, other manners may also be used.

304: The ePDG sends a binding update message for proxy mobile IP (Proxy Binding Update) to a packet gateway PGW, where the message carries the local address of the UE.

Certainly, the ePDG may also initiate a GTP create session request to the PGW, where the create session request carries the local address of the UE.

305: The PGW initiates an IP-CAN session establishment request to the PCRF, where the request carries the local address of the UE.

In this step, the PGW may further initiate an IP-CAN session modification request to the PCRF to carry the local address of the UE.

306: The PCRF associates the IP-CAN session and the gateway control session according to the local address of the UE.

In the description of this embodiment, the number of each step is not used to restrict its execution sequence; for example, step 302 may be executed at the same time with step 303 to step 305. This embodiment does not restrict its actual execution sequence.

In an interworking or roaming scenario, in step 302, the non-3GPP access network may first notify a local policy server of a local address allocation event, and then the local policy server initiates a policy session establishment request to a policy server PCRF in a home domain, where the policy session establishment request carries the local address of the UE.

In an actual network structure, the non-3GPP access network in this embodiment may be implemented through network entities in the following scenarios:

Scenario 1:

Non-3GPP access is implemented through interworking of fixed network access defined in 3GPP and BBF (Broadband Forum). Its specific form on a network is as follows: Non-3GPP access is implemented through a broadband remote access server BRAS and a policy controller PC, that is, the non-3GPP access network in this scenario includes network entities such as the BRAS and the PC.

Figure 4:
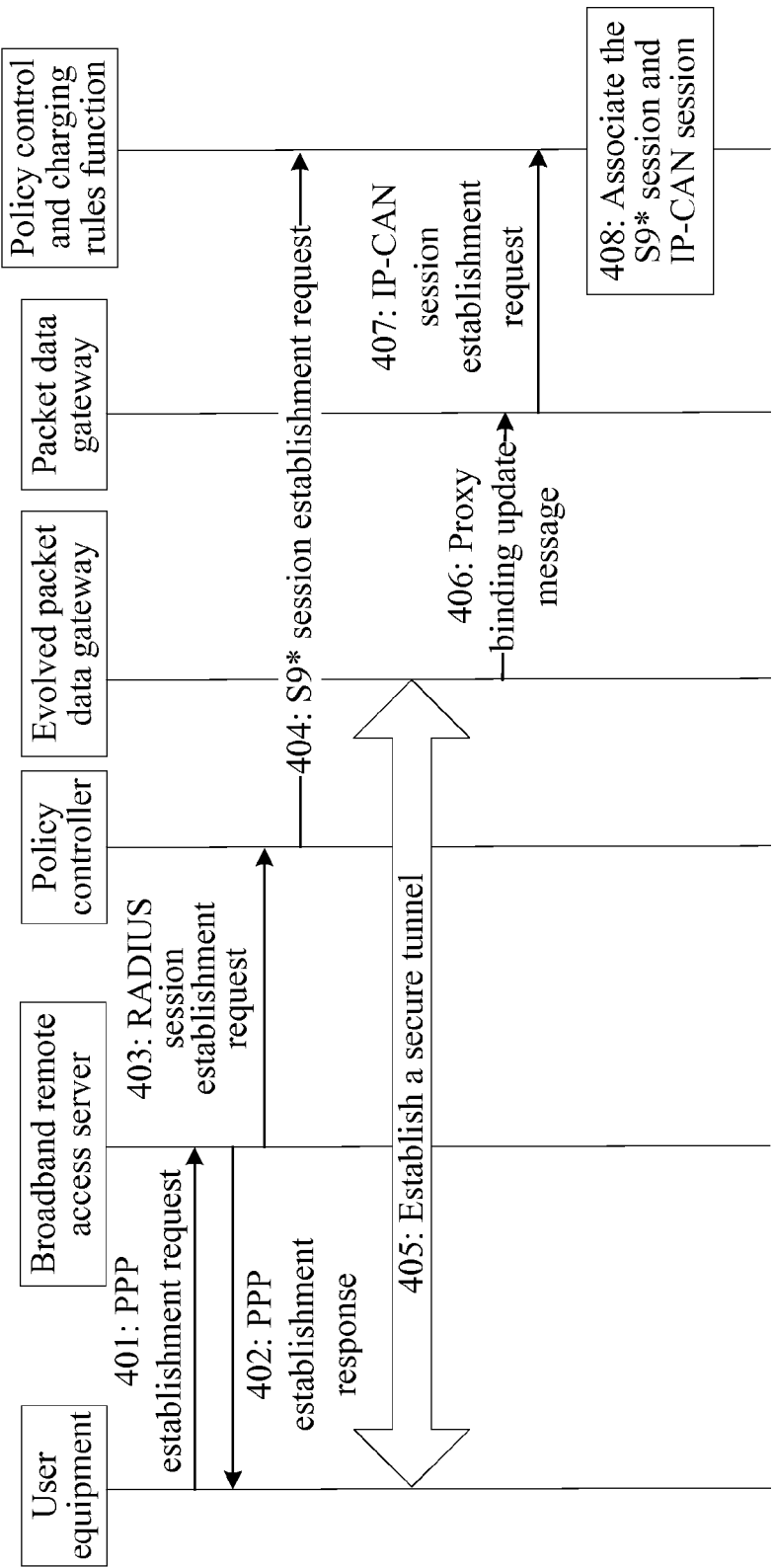
FIG. 4 is a first signaling flow chart of the method for associating sessions according to the second embodiment of the present invention.

In this case, as shown in FIG. 4, the specific implementation procedure of the method for associating sessions in this embodiment includes the following steps:

401: A UE sends a PPP establishment request to the BRAS to request an IP address.

A PPP establishment request is only taken as an example here. In addition to the PPP establishment request, the UE may further use a DHCP request or other requests to request a corresponding local address from the BRAS.

402: The BRAS allocates a local address IP1 to the UE, and returns the local address IP1 through a PPP establishment response message to the UE.

If the UE sends a DHCP request message in step 401, the BRAS returns a DHCP response message to the UE in step 402.

403: The BRAS initiates a RADIUS (Remote Authentication Dial-In User Service) session request to a PC, where the RADIUS session request carries the local address IP1 of the UE.

In this step, the BRAS may also carry the local address IP1 of the UE by initiating a Diameter session establishment request to the PC.

404: The PC initiates an S9* session establishment request to the PCRF, where the S9* session establishment request carries the local address IP1 of the UE.

405: The UE establishes a secure tunnel with a secure gateway ePDG, and the ePDG acquires the local address IP1 of the UE during the procedure for establishing the secure tunnel.

406: The ePDG initiates a binding update message of proxy mobile IP to a PGW, where the binding update message carries the local address IP1 of the UE.

Here, the local address IP1 of the UE may further be carried in a GTP create session message initiated by the ePDG to the PGW.

407: The PGW initiates an IP-CAN session establishment request to the PCRF, where the IP-CAN session establishment request carries the local address IP1 of the UE.

In this step, the PGW may further initiate an IP-CAN session modification request to the PCRF to carry the local address IP1 of the UE.

408: The PCRF associates the IP-CAN session and the S9* session according to the local address IP1 of the UE.

In the description of the preceding method, a number corresponding to each step is not used to restrict its execution sequence; for example, step 402 and step 403 do not follow a strict sequence, and steps 403 and 404 may be executed at the same time with step 405 to step 407. This embodiment does not restrict the actual execution sequence of each step.

Scenario 2:

Non-3GPP access is implemented through interworking of fixed network access defined in 3GPP and TISPAN (Telecommunications and Internet Converged Services and Protocols for Advanced Networking). Its specific form on a network is as follows: Non-3GPP access is implemented through a NASS (Network Attachment Sub-System) and an RACS (Resource and Admission Control Subsystem), that is, the non-3GPP access network in this scenario includes network entities such as the NASS and the RACS.

Figure 5:
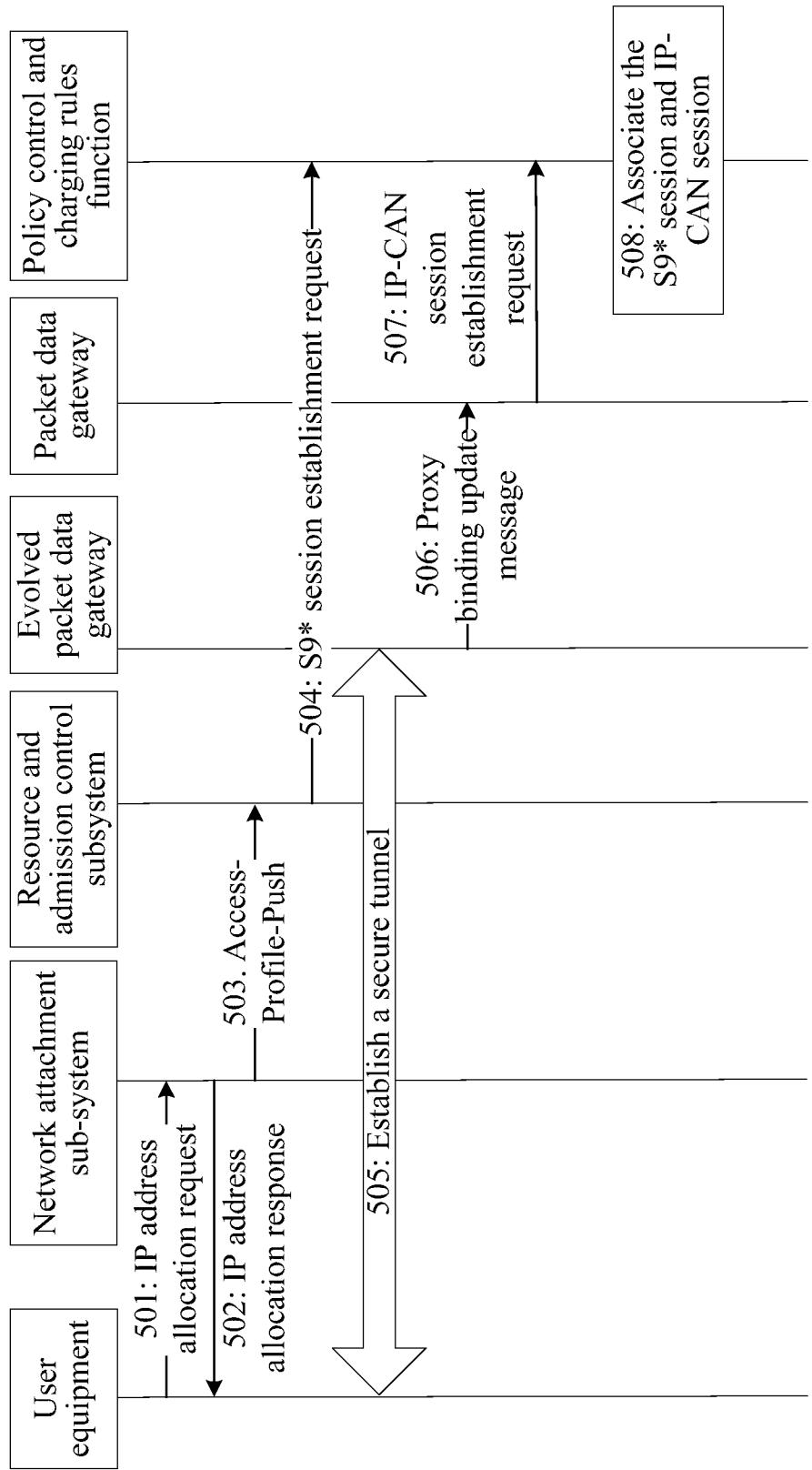
FIG. 5 is a second signaling flow chart of the method for associating sessions according to the second embodiment of the present invention.

The specific implementation procedure of the method for associating sessions in the current scenario is shown in FIG. 5. It may be seen that, the procedure is similar to the implementation procedure of the method for associating sessions in scenario 1. Due to differences of network entities on the non-3GPP access network, the following differences exist:

In step 503, the NASS sends an Access-Profile-Push message to the RACS, where the Access-Profile-Push message carries the local address IP1 of the UE.

In the next step 504, the RACS initiates an S9* session establishment request to the PCRF, which carries the local address IP1 of the UE.

For implementation of the rest steps, reference may be made to the description about the method for associating sessions in scenario 1. The implementation is not described herein.

According to the method for associating sessions in this embodiment, when a UE uses non-3GPP access, and proxy mobile IP or GTP is used between a secure gateway ePDG and a PGW, a local address of the UE is carried in an IP-CAN session establishment request or IP-CAN session modification request, so that an IP-CAN session and a gateway control session corresponding to a same UE may be associated according to the local address to ensure that different sessions corresponding to the same UE comply with a same service policy. The solution provided in this embodiment may implement correct association between different policy control sessions when an access network is connected to a core network through a secure gateway ePDG.

Embodiment 3

The following describes the method for associating sessions provided in this embodiment with another specific scenario. Specifically, the method for associating sessions provided in this embodiment may be applicable to the following scenario: A user equipment (UE) accesses a network through an untrusted non-3GPP access network, and a proxy mobile IP or GTP message is used between a secure gateway ePDG and a PGW.

Figure 6:
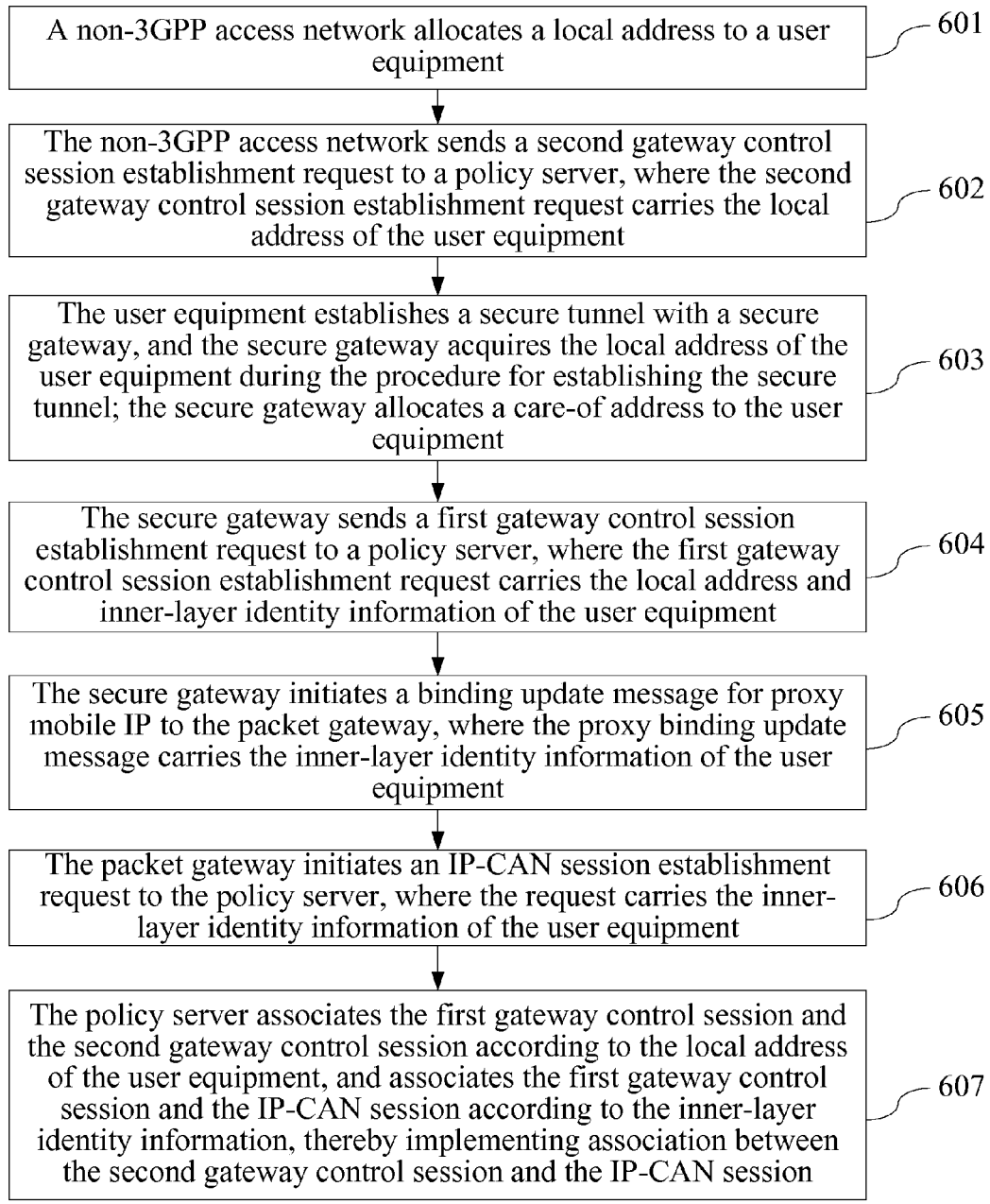
FIG. 6 is a flow chart of a method for associating sessions according to a third embodiment of the present invention.

In this embodiment, as shown in FIG. 6, the method for associating sessions specifically includes the following steps:

601: A non-3GPP access network allocates a local address (IP_Local) to a UE.

Specifically, the procedure for allocating, by the non-3GPP access network, the local address to the UE may be but is not limited to allocating an address through DHCP, or PPP, or other address allocation methods specific to access technologies.

602: The non-3GPP access network sends a second gateway control session establishment request to a policy server PCRF, where the second gateway control session establishment request carries the local address of the UE.

603: The UE establishes a secure tunnel with a secure gateway ePDG, and the ePDG acquires the local address of the UE during the procedure for establishing the secure tunnel.

The secure tunnel may be established through, but not limited to, an Internet key exchange protocol (IKEv2). Certainly, other manners may also be used.

604: The ePDG initiates a first gateway control session establishment request to the PCRF, where the first gateway control session establishment request carries the local address of the UE and IP connectivity information.

In the first gateway control session establishment request, the IP connectivity information may include a subscriber identity and a PDN identity of the UE; in addition, one or both of a corresponding home address HoA and a PDN connection identity of the UE may further be included.

605: The ePDG initiates a binding update message for proxy mobile IP to a PGW, where the proxy binding update message carries the IP connectivity information of the UE.

Certainly, the ePDG may also initiate a GTP create session request to the PGW, where the create session request carries the IP connectivity information of the UE.

606: The PGW initiates an IP-CAN session establishment request to the PCRF, where the request carries the IP connectivity information of the UE.

In this step, the PGW may further initiate an IP-CAN session modification request to the PCRF to carry the local address of the UE.

607: The PCRF associates the first gateway control session and the second gateway control session according to the local address of the UE, and associates the first gateway control session and the IP-CAN session according to the IP connectivity information, thereby achieving association between the second gateway control session and the IP-CAN session.

The PCRF may use an existing technology to associate the IP-CAN session and the first gateway control session, for example, according to the HoA and PDN identity, or according to the subscriber identity and PDN identity, or according to the subscriber identity, PDN identity, and PDN connection identity.

The associated first gateway control session and associated second gateway control session are in a one-to-one relationship. The associated first gateway control session and IP-CAN session are also in a one-to-one relationship. Therefore, it may be regarded that the second gateway control session and IP-CAN session is also in a one-to-one relationship, and thereby the second gateway control session and IP-CAN session are associated.

In the description of this embodiment, the number of each step is not used to restrict its execution sequence; for example, step 604 may be executed at the same time with steps 605 and 606, and step 602 may be executed at the same time with step 603 to step 606. This embodiment does not restrict its actual execution sequence.

In an interworking or roaming scenario, in step 602, the non-3GPP access network may first notify a local policy server of a local address allocation event, and then the local policy server initiates a policy session establishment request to a policy server PCRF in a home domain, where the policy session establishment request carries the local address of the UE.

In an actual network structure, the non-3GPP access network in this embodiment may be implemented through network entities in the following scenarios:

Scenario 3:

Non-3GPP access is implemented through interworking of fixed network access defined in 3GPP and BBF. Its specific form on a network is as follows: Non-3GPP access is implemented through a broadband remote access server BRAS and a policy controller PC, that is, the non-3GPP access network in this scenario includes network entities such as the BRAS and the PC.

Figure 7:
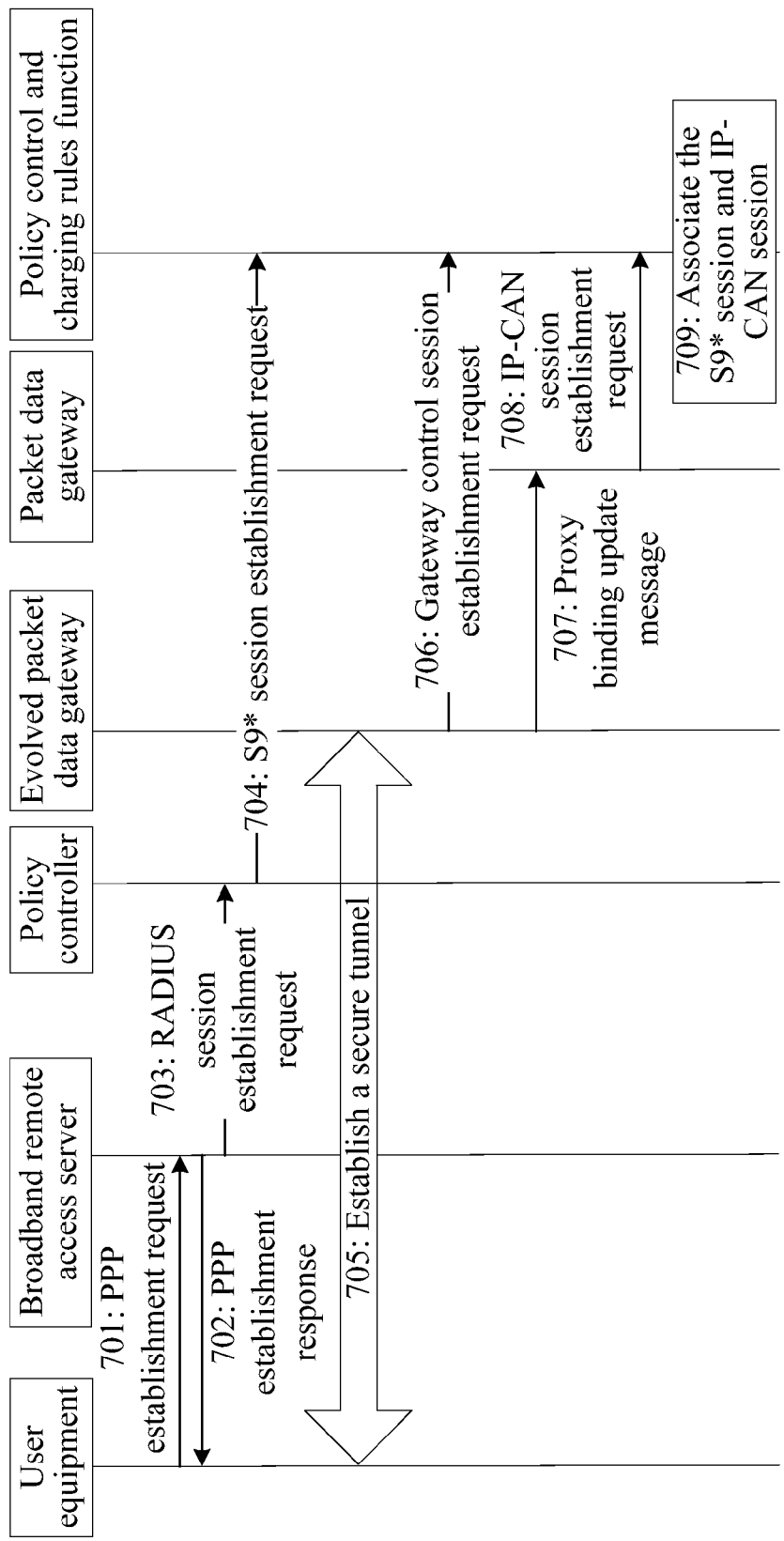
FIG. 7 is a first signaling flow chart of the method for associating sessions according to the third embodiment of the present invention.

In this case, as shown in FIG. 7, the specific implementation procedure of the method for associating sessions in this embodiment includes the following steps:

701: A UE sends a PPP establishment request to the BRAS to request an IP address.

A PPP establishment request is only taken as an example here. In addition to the PPP establishment request, the UE may further use a DHCP request or other requests to request a corresponding local address from the BRAS.

702: The BRAS allocates a local address IP1 to the UE, and returns the local address IP1 through a PPP establishment response message to the UE.

If the UE sends a DHCP request message in step 701, the BRAS returns a DHCP response message to the UE in step 702.

703: The BRAS initiates a RADIUS session establishment request to the PCRF, where the RADIUS session establishment request carries the local address IP1 of the UE.

704: The policy controller PC initiates an S9* session establishment request to the PCRF, where the S9* session establishment request carries the local address IP1 of the UE.

705: The UE establishes a secure tunnel with a secure gateway ePDG, and the ePDG acquires the local address IP1, a subscriber identity, and a PDN identity of the UE during the procedure for establishing the secure tunnel.

706: The ePDG initiates a gateway control session establishment request to the PCRF, where the gateway control session establishment request carries the local address IP1, subscriber identity, and PDN identity of the UE.

707: The ePDG initiates a binding update message for proxy mobile IP to a PGW, where the proxy binding update message carries the subscriber identity and PDN identity of the UE.

Here, the subscriber identity and PDN identity of the UE may further be carried in a GTP create session message initiated by the ePDG to the PGW.

708: The PGW initiates an IP-CAN session establishment request to the PCRF, where the IP-CAN session establishment request carries the subscriber identity and PDN identity of the UE.

In this step, the PGW may further initiate an IP-CAN session modification request to the PCRF to carry the subscriber identity and PDN identity of the UE.

709: The PCRF associates the S9* session and the gateway control session according to the local address IP1 of the UE, and associates the gateway control session and the IP-CAN session according to the subscriber identity and PDN identity of the UE, thereby achieving association between the S9* session and the IP-CAN session.

In the description of the preceding method, a number corresponding to each step is not used to restrict its execution sequence; for example, step 702 and step 703 do not follow a strict sequence, steps 703 and 704 may be executed at the same time with step 705 to step 708, and step 706 may be executed at the same time with steps 707 and step 708. This embodiment does not restrict the actual execution sequence of each step.

Scenario 4:

Non-3GPP access is implemented through interworking of fixed network access defined in 3GPP and TISPAN. Its specific form on a network is as follows: Non-3GPP access of a UE is implemented through a NASS and an RACS, that is, the non-3GPP access network in this scenario includes network entities such as the NASS and the RACS.

Figure 8:
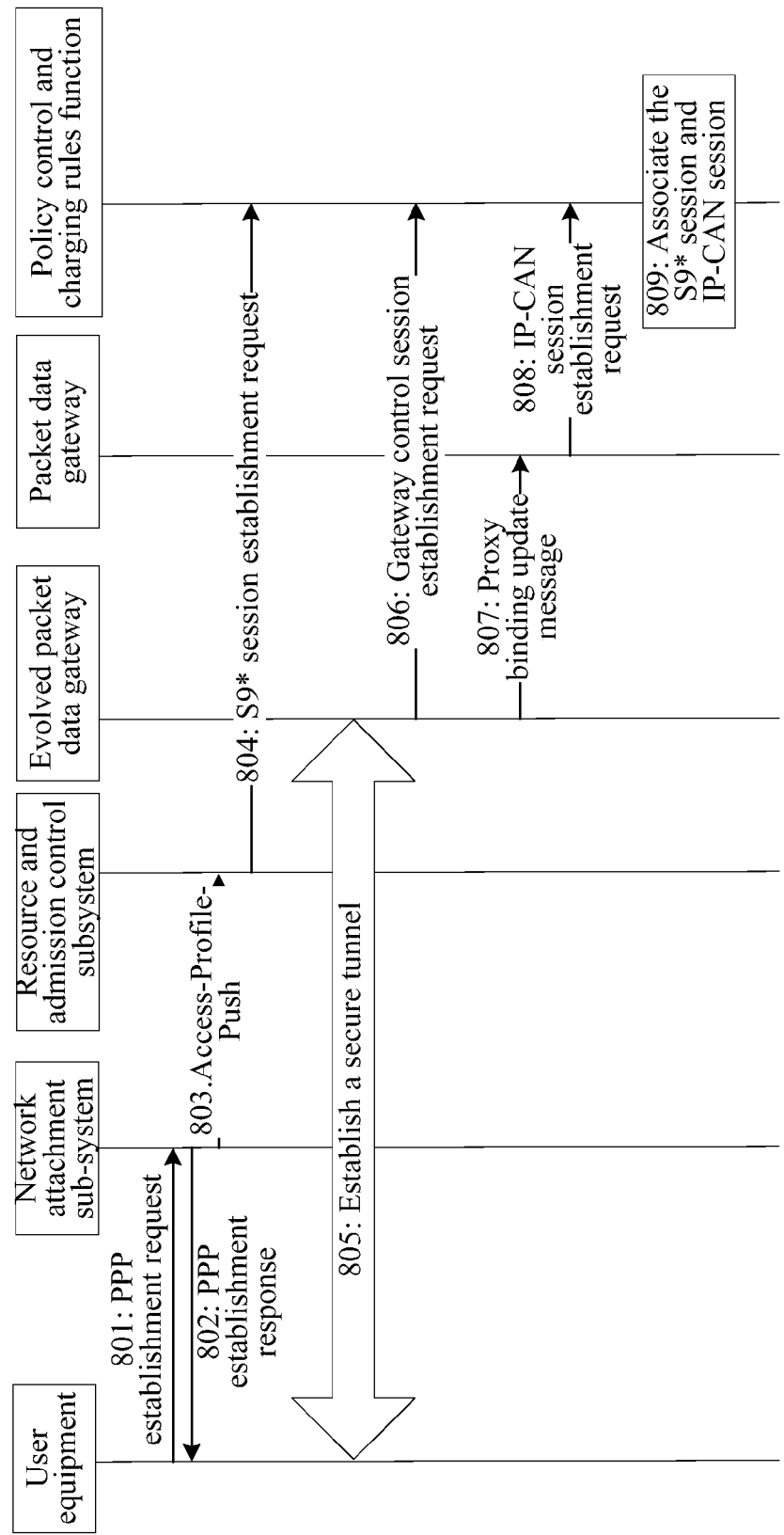
FIG. 8 is a second signaling flow chart of the method for associating sessions according to the third embodiment of the present invention.

The specific implementation procedure of the method for associating sessions in the current scenario is shown in FIG. 8. It may be seen that, the procedure is similar to the implementation procedure of the method for associating sessions in scenario 1. Due to differences of network entities on the non-3GPP access network, the following differences exist:

In step 803, the NASS sends an Access-Profile-Push message to the RACS, where the Access-Profile-Push message carries the local address IP1 of the UE.

In the next step 804, the RACS initiates an S9* session establishment request to the PCRF, which carries the local address IP1 of the UE.

For implementation of the rest steps, reference may be made to the description about the method for associating sessions in scenario 3. The implementation is not described herein.

According to the method for associating sessions in this embodiment, when a UE uses non-3GPP access, and proxy mobile IP or GTP is used between a secure gateway ePDG and a PGW, a local address of the UE is carried in a first gateway control session establishment request, so that a first gateway control session and a second gateway control session initiated by a non-3GPP access network corresponding to a same UE may be associated according to the local address to ensure that different sessions corresponding to the same UE comply with a same service policy. The solution provided in this embodiment may implement correct association between different policy control sessions when an access network is connected to a core network through a secure gateway ePDG.

Embodiment 4

The following describes the method for associating sessions provided in this embodiment with still another specific scenario. Specifically, the method for associating sessions provided in this embodiment may be applicable to the following scenario: A UE accesses a network through an untrusted non-3GPP access network, and mobile IP is used between the UE and a PGW.

Figure 9:
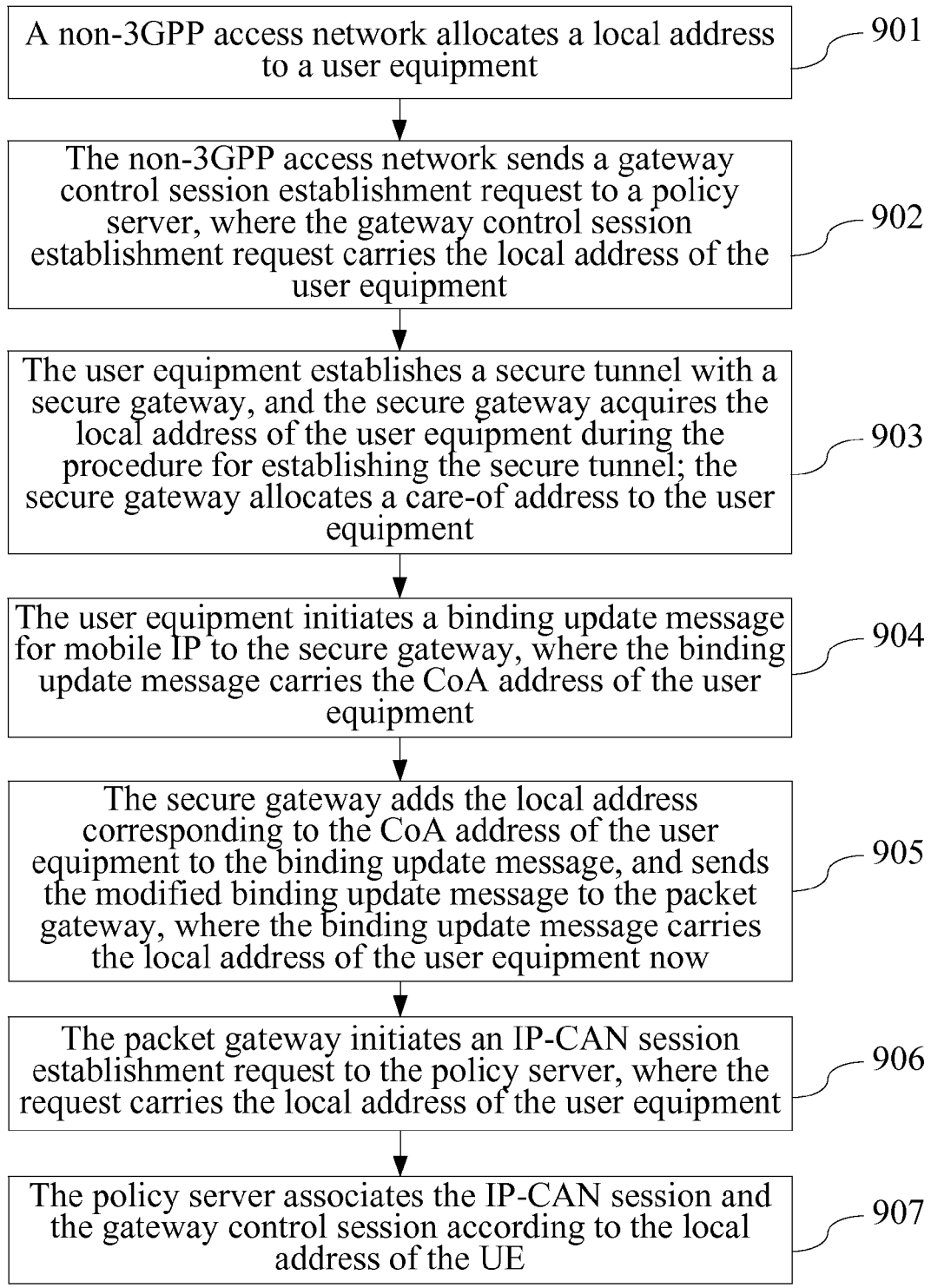
FIG. 9 is a flow chart of a method for associating sessions according to a fourth embodiment of the present invention.

In this embodiment, as shown in FIG. 9, the method for associating sessions specifically includes the following steps:

901: A non-3GPP access network allocates a local address (IP_Local) to a UE.

Specifically, the procedure for allocating, by the non-3GPP access network, the local address to the UE may be but is not limited to allocating an address through DHCP, or PPP, or other address allocation methods specific to access technologies.

902: The non-3GPP access network sends a gateway control session establishment request to a policy server PCRF, where the gateway control session establishment request carries the local address of the UE.

903: The UE establishes a secure tunnel with a secure gateway ePDG, and the ePDG acquires the local address of the UE during the procedure for establishing the secure tunnel; in addition, the ePDG allocates a care-of address (CoA) to the UE.

The secure tunnel may be established through, but not limited to, an Internet key exchange protocol (IKEv2). Certainly, other manners may also be used.

904: The UE initiates a binding update message for mobile IP to the ePDG, where the binding update message carries the CoA address of the UE.

905: The ePDG adds the local address corresponding to the CoA address of the UE to the binding update message, and sends the modified binding update message to the packet gateway PGW, where the binding update message carries the local address of the UE now.

906: The PGW initiates an IP-CAN session establishment request to the PCRF, where the request carries the local address of the UE.

In this step, the PGW may further initiate an IP-CAN session modification request to the PCRF to carry the local address of the UE.

907: The PCRF associates the IP-CAN session and the gateway control session according to the local address of the UE.

In the description of this embodiment, the number of each step is not used to restrict its execution sequence; for example, step 902 may be executed at the same time with step 903 to step 906. This embodiment does not restrict its actual execution sequence.

In an interworking or roaming scenario, in step 902, the non-3GPP access network may first notify a local policy server of a local address allocation event, and then the local policy server initiates a policy session establishment request to a policy server PCRF in a home domain, where the policy session establishment request carries the local address of the UE.

In an actual network structure, the non-3GPP access network in this embodiment may be implemented through network entities in the following scenarios:

Scenario 5:

Non-3GPP access is implemented through interworking of fixed network access defined in 3GPP and BBF. Its specific form on a network is as follows: Non-3GPP access is implemented through a broadband remote access server BRAS and a policy controller PC, that is, the non-3GPP access network in this scenario includes network entities such as the BRAS and the PC.

Figure 10:
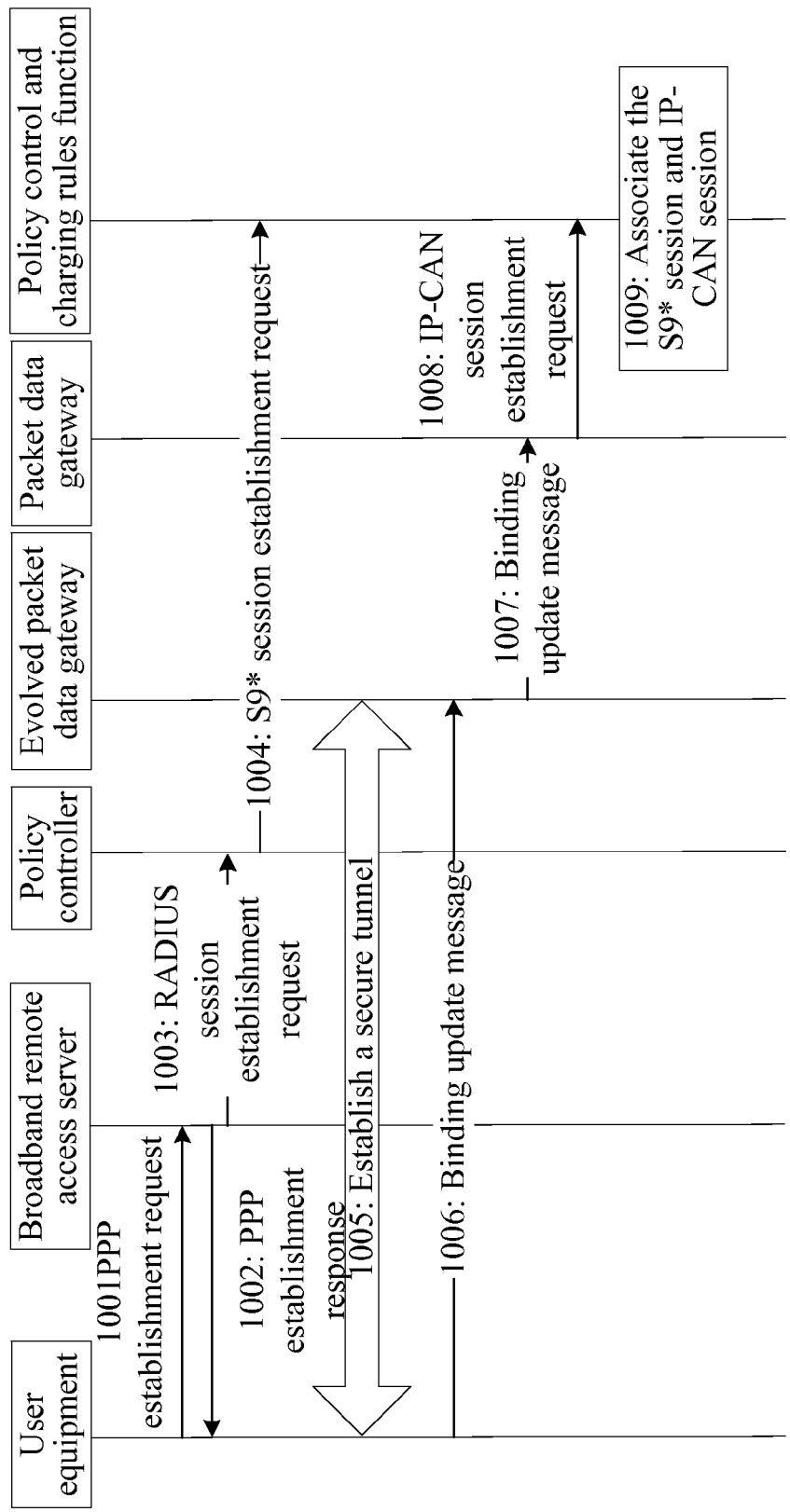
FIG. 10 is a signaling flow chart of a method for associating sessions according to a fourth embodiment of the present invention.

In this case, as shown in FIG. 10, the specific implementation procedure of the method for associating sessions in this embodiment includes the following steps:

1001: A UE sends a PPP establishment request to the BRAS to request an IP address.

A PPP establishment request is only taken as an example here. In addition to the PPP establishment request, the UE may further use a DHCP request or other requests to request a corresponding local address from the BRAS.

1002: The BRAS allocates a local address IP1 to the UE, and returns the local address IP1 through a PPP establishment response message to the UE.

If the UE sends a DHCP request message in step 1001, the BRAS returns a DHCP response message to the UE in step 1002.

1003: The BRAS initiates a RADIUS (Remote Authentication Dial-In User Service) session request to a PC, where the RADIUS session request carries the local address IP1 of the UE.

1004: The PC initiates an S9* session establishment request to the PCRF, where the S9* session establishment request carries the local address IP1 of the UE.

1005: The UE establishes a secure tunnel with a secure gateway ePDG, and the ePDG acquires the local address IP1 of the UE during the procedure for establishing the secure tunnel; in addition, the ePDG allocates a CoA address to the UE.

1006: The UE initiates a binding update message for mobile IP to the ePDG, where the binding update message carries the CoA address IP2 of the UE.

1007: The ePDG adds the local address IP1 corresponding to the CoA address IP2 of the UE to the binding update message, and sends the modified binding update message to the PGW, where the proxy binding update message carries the local address IP1 of the UE now.

1008: The PGW initiates an IP-CAN session establishment request to the PCRF, where the IP-CAN session establishment request carries the local address IP1 of the UE.

In this step, the PGW may further initiate an IP-CAN session modification request to the PCRF to carry the local address IP1 of the UE.

1009: The PCRF associates the IP-CAN session and the S9* session according to the local address IP1 of the UE.

In the description of the preceding method, a number corresponding to each step is not used to restrict its execution sequence; for example, step 1002 and step 1003 do not follow a strict sequence, and steps 1003 and 1004 may be executed at the same time with step 1005 to step 1008. This embodiment does not restrict the actual execution sequence of each step.

According to the method for associating sessions provided in this embodiment, when a UE uses non-3GPP access, and mobile IP is used between the UE and a PGW, a local address of the UE is carried in an IP-CAN session establishment request or IP-CAN session modification request, so that an IP-CAN session and a gateway control session corresponding to a same UE may be associated according to the local address to ensure that different sessions corresponding to the same UE comply with a same service policy. The solution provided in this embodiment may implement correct association between different policy control sessions when an access network is connected to a core network through a secure gateway ePDG.

Embodiment 5

The following describes the method for associating sessions provided in this embodiment with still another specific scenario. Specifically, the method for associating sessions provided in this embodiment may be applicable to the following scenario: A UE accesses a network through an untrusted non-3GPP access network, and mobile IP is used between the UE and a PGW.

Figure 11:
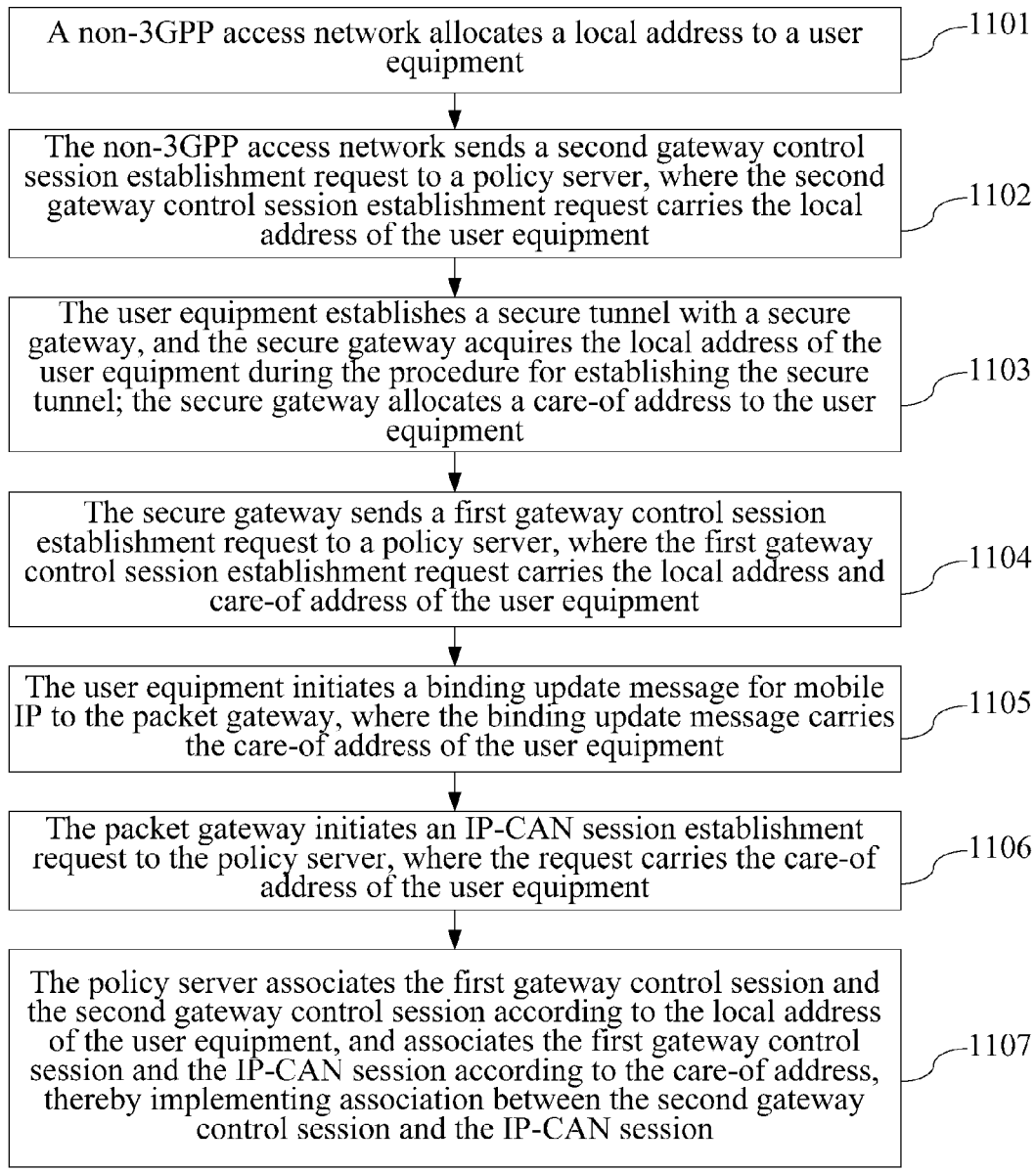
FIG. 11 is a flow chart of a method for associating sessions according to a fifth embodiment of the present invention.

In this embodiment, as shown in FIG. 11, the method for associating sessions specifically includes the following steps:

1101: A non-3GPP access network allocates a local address (IP_Local) to a UE.

Specifically, the procedure for allocating, by the non-3GPP access network, the local address to the UE may be but is not limited to allocating an address through DHCP, or PPP, or other address allocation methods specific to access technologies.

1102: The non-3GPP access network sends a second gateway control session establishment request to a policy server PCRF, where the second gateway control session establishment request carries the local address of the UE.

1103: The UE establishes a secure tunnel with a secure gateway ePDG, and the ePDG acquires the local address of the UE during the procedure for establishing the secure tunnel; in addition, the ePDG allocates a care-of address (CoA) to the UE.

The secure tunnel may be established through, but not limited to, an Internet key exchange protocol (IKEv2). Certainly, other manners may also be used.

1104: The ePDG initiates a first gateway control session establishment request to the PCRF, where the first gateway control session establishment request carries the local address of the UE and IP connectivity information.

In the first gateway control session establishment request, the IP connectivity information may include a CoA address of the UE; in addition, a home address HoA corresponding to the UE may further be included.

1105: The UE initiates a binding update message for mobile IP to a packet gateway PGW, where the binding update message carries the IP connectivity information of the UE.

1106: The PGW initiates an IP-CAN session establishment request to the PCRF, where the request carries the CoA address of the UE.

In this step, the PGW may further initiate an IP-CAN session modification request to the PCRF to carry the CoA address of the UE.

1107: The PCRF associates the first gateway control session and the second gateway control session according to the local address of the UE, and associates the first gateway control session and the IP-CAN session according to the CoA address, thereby achieving association between the second gateway control session and the IP-CAN session.

The PCRF may use an existing technology to associate the IP-CAN session and the first gateway control session, for example, according to the CoA address.

The associated first gateway control session and associated second gateway control session are in a one-to-one relationship. The associated first gateway control session and IP-CAN session are also in a one-to-one relationship. Therefore, it may be regarded that the second gateway control session and IP-CAN session is also in a one-to-one relationship, and thereby the second gateway control session and IP-CAN session are associated.

In the description of this embodiment, the number of each step is not used to restrict its execution sequence; for example, step 1104 may be executed at the same time with steps 1105 and 1106, and step 1102 may be executed at the same time with step 1103 to step 1106. This embodiment does not restrict its actual execution sequence.

In an interworking or roaming scenario, in step 1102, the non-3GPP access network may first notify a local policy server of a local address allocation event, and then the local policy server initiates a policy session establishment request to a policy server PCRF in a home domain, where the policy control session request carries the local address of the UE.

In an actual network structure, the non-3GPP access network in this embodiment may be achieved through network entities in the following scenarios:

Scenario 6:

Non-3GPP access is implemented through interworking of fixed network access defined in 3GPP and BBF. Its specific form on a network is as follows: Non-3GPP access is implemented through a broadband remote access server BRAS and a policy controller PC, that is, the non-3GPP access network in this scenario includes network entities such as the BRAS and the PC.

Figure 12:
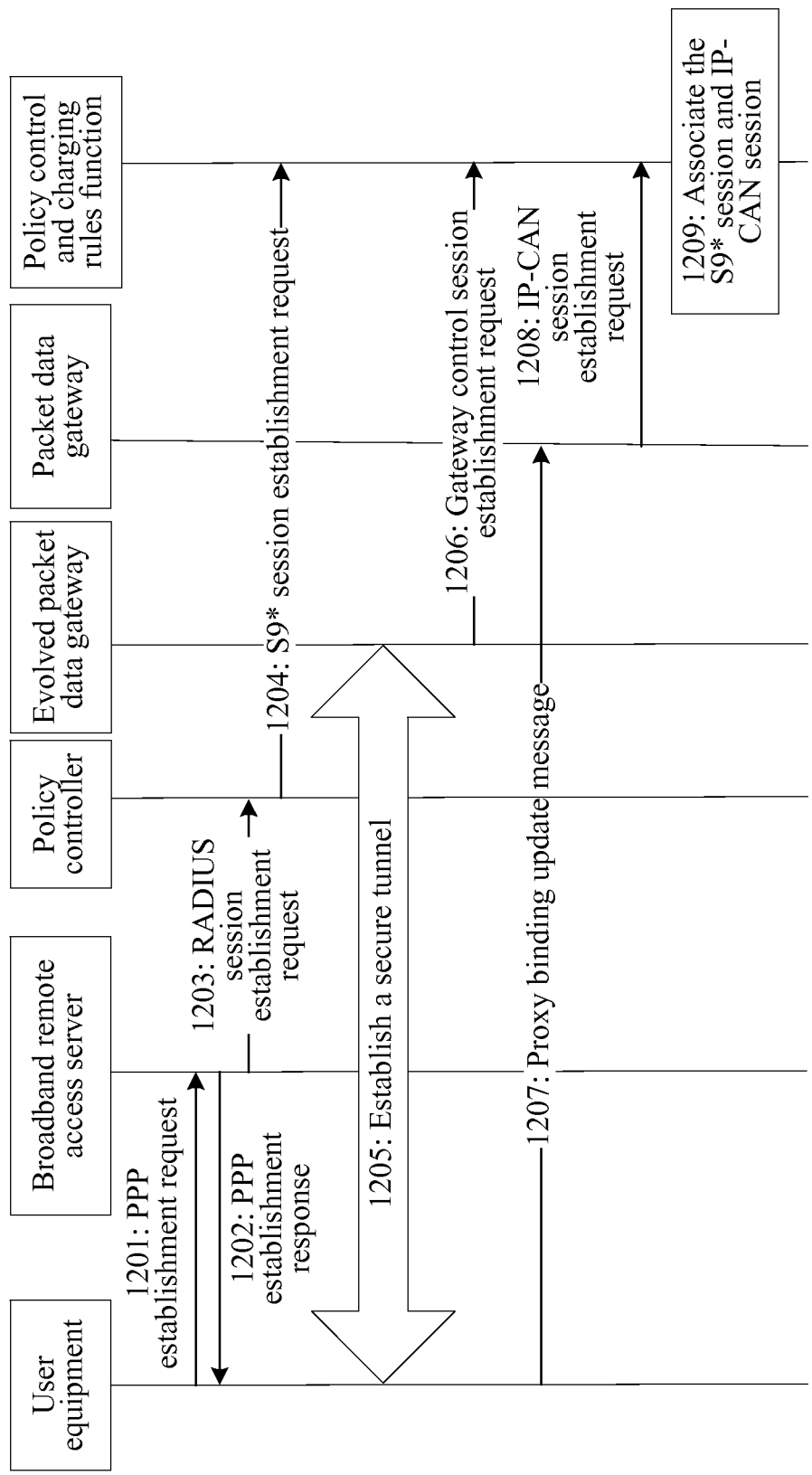
FIG. 12 is a signaling flow chart of the method for associating sessions according to the fifth embodiment of the present invention.

In this case, as shown in FIG. 12, the specific implementation procedure of the method for associating sessions in this embodiment includes the following steps:

1201: A UE sends a PPP establishment request to the BRAS to request an IP address.

A PPP establishment request is only taken as an example here. In addition to the PPP establishment request, the UE may further use a DHCP request or other requests to request a corresponding local address from the BRAS.

1202: The BRAS allocates a local address IP1 to the UE, and returns the local address IP1 through a PPP establishment response message to the UE.

If the UE sends a DHCP request message in step 1201, the BRAS returns a DHCP response message to the UE in step 1202.

1203: The BRAS initiates a RADIUS session establishment request to the PCRF, where the RADIUS session establishment request carries the local address IP1 of the UE.

1204: The policy controller initiates an S9* session establishment request to the PCRF, where the S9* session establishment request carries the local address IP1 of the UE.

1205: The UE establishes a secure tunnel with a secure gateway ePDG, and the ePDG acquires the local address IP1 during the procedure for establishing the secure tunnel; in addition, the ePDG allocates a CoA address IP2 to the UE.

1206: The ePDG initiates a gateway control session establishment request to the PCRF, where the gateway control session establishment request carries the local address IP1 and CoA address IP2 of the UE.

1207: The UE initiates a binding update message for mobile IP to the PGW, where the binding update message carries the CoA address IP2 of the UE.

1208: The PGW initiates an IP-CAN session establishment request to the PCRF, where the IP-CAN session establishment request carries the CoA address IP2 of the UE.

In this step, the PGW may further initiate an IP-CAN session modification request to the PCRF to carry the CoA address IP2 of the UE.

1209: The PCRF associates the S9* session and the gateway control session according to the local address IP1 of the UE, and associates the gateway control session and the IP-CAN session according to the CoA address IP2 of the UE, thereby achieving association between the S9* session and the IP-CAN session.

In the description of the preceding method, a number corresponding to each step is not used to restrict its execution sequence; for example, step 1202 and step 1203 do not follow a strict sequence, steps 1203 and 1204 may be executed at the same time with step 1205 to step 1208, and step 1206 may be executed at the same time with steps 1207 and step 1208. This embodiment does not restrict the actual execution sequence of each step.

According to the method for associating sessions in this embodiment, when a UE uses non-3GPP access, and mobile IP is used between the UE and a PGW, a local address of the UE is carried in a first gateway control session establishment request, so that a first gateway control session and a second gateway control session initiated by a non-3GPP access network corresponding to a same UE may be associated according to the local address to ensure that different sessions corresponding to the same UE comply with a same service policy. The solution provided in this embodiment may implement correct association between different policy control sessions when an access network is connected to a core network through a secure gateway ePDG.

Embodiment 6

In all of the preceding embodiments, the PCRF associates different policy control sessions; in addition, this embodiment further introduces a method for implementing association between different policy control sessions through a policy controller PC.

The following describes the method for associating sessions provided in this embodiment with a specific scenario. Specifically, the method for associating sessions provided in this embodiment may be applicable to the following scenario: A UE accesses a network through an untrusted non-3GPP access network, and a proxy mobile IP or GTP message is used between a secure gateway ePDG and a PGW.

Figure 13:
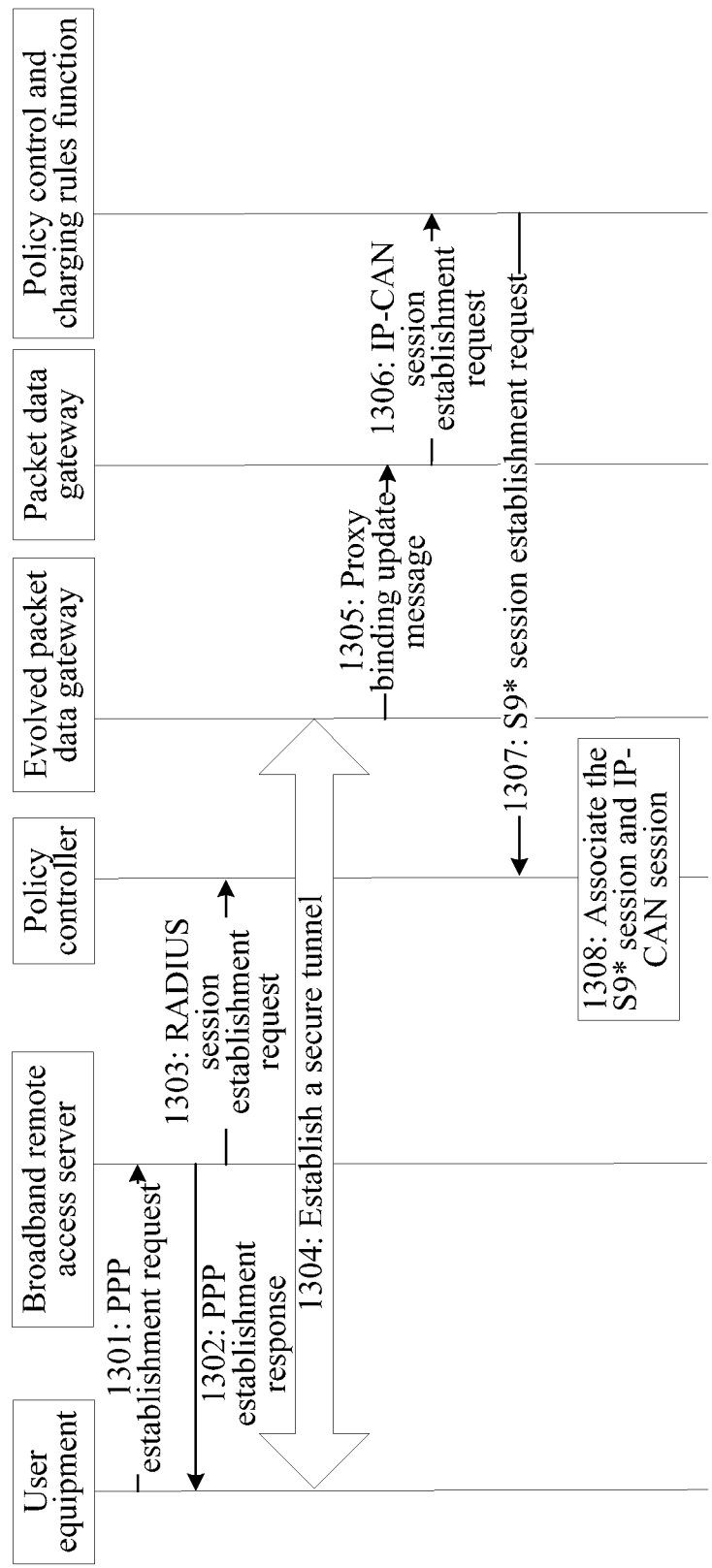
FIG. 13 is a first signaling flow chart of a method for associating sessions according to a sixth embodiment of the present invention.

In this embodiment, the untrusted non-3GPP access network may be implemented through interworking of fixed network access defined in 3GPP and BBF. Its specific form on a network is as follows: Non-3GPP access is implemented through a broadband remote access server BRAS and a policy controller PC, that is, the non-3GPP access network in this embodiment includes network entities such as the BRAS and the PC. The following provides two different implementation methods for associating sessions in this scenario:

As shown in FIG. 13, one method for associating sessions provided in this embodiment specifically includes the following steps:

1301: A UE sends a PPP establishment request to the BRAS to request an IP address.

A PPP establishment request is only taken as an example here. In addition to the PPP establishment request, the UE may further use a DHCP request or other requests to request a corresponding local address from the BRAS.

1302: The BRAS allocates a local address IP1 to the UE, and returns the local address IP1 through a PPP establishment response message to the UE.

If the UE sends a DHCP request message in step 1301, the BRAS returns a DHCP response message to the UE in step 1302.

1303: The BRAS initiates a RADIUS session request to the PC, where the RADIUS session request carries the local address IP1 of the UE.

1304: The UE establishes a secure tunnel with a secure gateway ePDG, and the ePDG acquires the local address IP1 of the UE during the procedure for establishing the secure tunnel.

1305: The ePDG initiates a binding update message for proxy mobile IP to a PGW, where the binding update message carries the local address IP1 of the UE.

Here, the local address IP1 of the UE may further be carried in a GTP create session message initiated by the ePDG to the PGW.

1306: The PGW initiates an IP-CAN session establishment request to the PCRF, where the IP-CAN session establishment request carries the local address IP1 of the UE.

In this step, the PGW may further initiate an IP-CAN session modification request to the PCRF to carry the local address IP1 of the UE.

1307: The PCRF initiates an S9* session establishment request to the PC, where the S9* session establishment request carries the local address IP1 of the UE.

1308: The PC associates the RADIUS session and the S9* session according to the local address IP1 of the UE.

In the description of the preceding method, a number corresponding to each step is not used to restrict its execution sequence; for example, step 1302 and step 1303 do not follow a strict sequence, and step 1303 may be executed at the same time with step 1304 to step 407. This embodiment does not restrict the actual execution sequence of each step.

Figure 14:
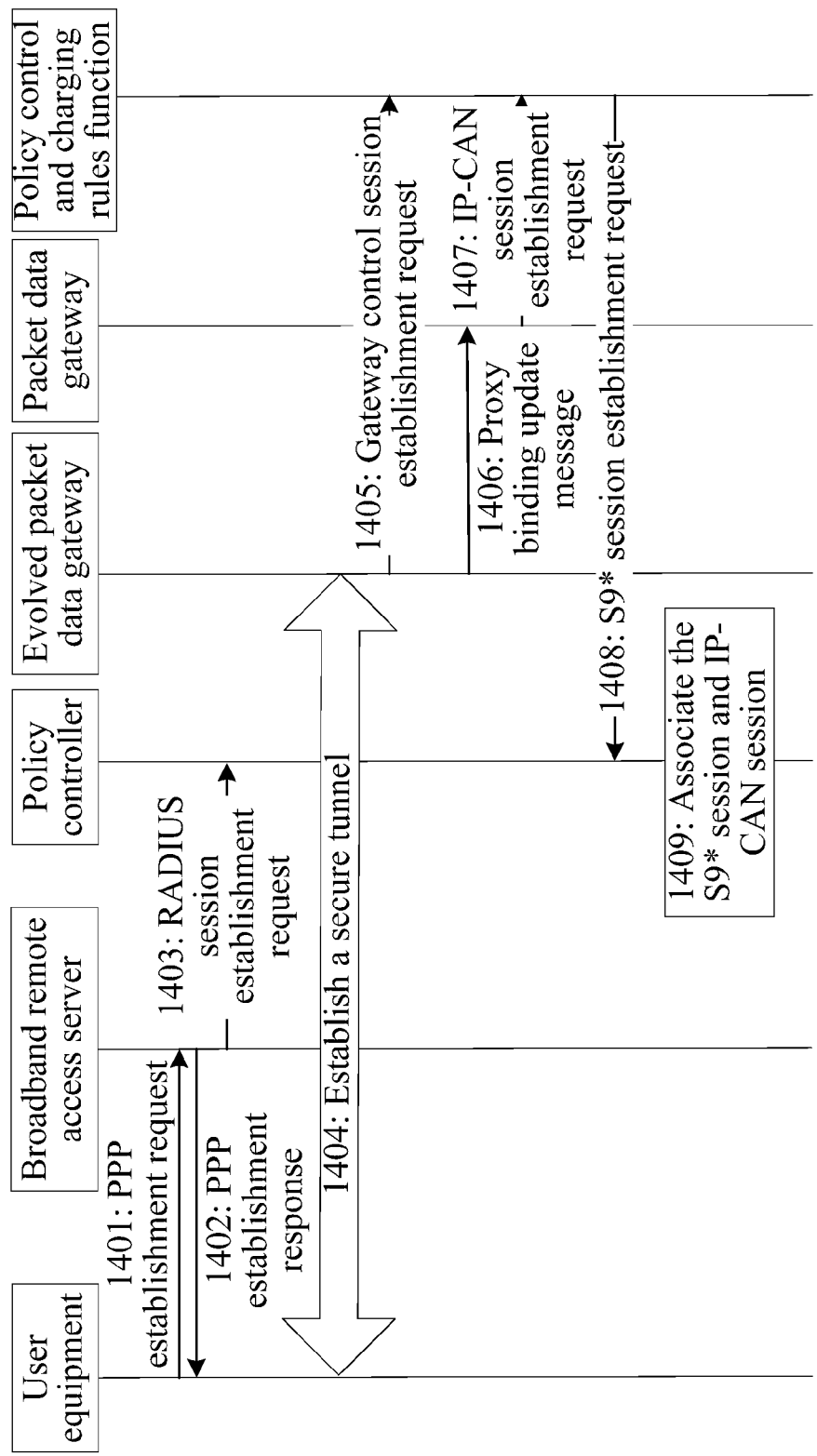
FIG. 14 is a second signaling flow chart of the method for associating sessions according to the sixth embodiment of the present invention.

As shown in FIG. 14, another method for associating sessions provided in this embodiment specifically includes the following steps:

1401: A UE sends a PPP establishment request to the BRAS to request an IP address.

A PPP establishment request is only taken as an example here. In addition to the PPP establishment request, the UE may further use a DHCP request or other requests to request a corresponding local address from the BRAS.

1402: The BRAS allocates a local address IP1 to the UE, and returns the local address IP1 through a PPP establishment response message to the UE.

If the UE sends a DHCP request message in step 1401, the BRAS returns a DHCP response message to the UE in step 1402.

1403: The BRAS initiates a RADIUS session establishment request to the PCRF, where the RADIUS session establishment request carries the local address IP1 of the UE.

1404: The UE establishes a secure tunnel with a secure gateway ePDG, and the ePDG acquires the local address IP1, a subscriber identity, and a PDN identity of the UE during the procedure for establishing the secure tunnel.

1405: The ePDG initiates a gateway control session establishment request to the PCRF, where the gateway control session establishment request carries the local address IP1, subscriber identity, and PDN identity of the UE.

1406: The ePDG initiates a binding update message for proxy mobile IP to a PGW, where the proxy binding update message carries the subscriber identity and PDN identity of the UE.

Here, the subscriber identity and PDN identity of the UE may further be carried in a GTP create session message initiated by the ePDG to the PGW.

1407: The PGW initiates an IP-CAN session establishment request to the PCRF, where the IP-CAN session establishment request carries the subscriber identity and PDN identity of the UE.

In this step, the PGW may further initiate an IP-CAN session modification request to the PCRF to carry the subscriber identity and PDN identity of the UE.

1408: The PCRF initiates an S9* session establishment request to the PC, where the S9* session establishment request carries the local address IP1 of the UE.

The gateway control session and the IP-CAN session may be associated according to the subscriber identity and PDN identity of the UE, and the local address IP of the UE carried in the S9* session establishment request is obtained through the gateway control session establishment request in step 1405. Therefore, the S9* session and the IP-CAN session are corresponding to the local address of the same UE. That is, the S9* session and the IP-CAN session are associated.

1409: The PC associates the S9* session and the RADIUS session according to the local address IP1 of the UE.

In this case, the S9* session and the IP-CAN session are associated, and the S9* session and the RADIUS session are also associated. Therefore, it may be regarded that the IP-CAN session and the RADIUS session are also associated.

In the description of the preceding method, a number corresponding to each step is not used to restrict its execution sequence; for example, step 1402 and step 1403 do not follow a strict sequence, step 1403 may be executed at the same time with step 1404 to step 1408, and step 1405 may be executed at the same time with steps 1406 and step 1407. This embodiment does not restrict the actual execution sequence of each step.

According to the method for associating sessions provided in the embodiment of the present invention, the local address of the user equipment is carried in the policy control session, so that different policy control sessions of a same user equipment may be associated according to the local address to ensure that the service policies followed by different sessions of the same user equipment are consistent. The solution provided in the embodiment of the present invention may implement correct association between different policy control sessions but do not rely on information of the user equipment such as an HoA/CoA address or a PDN identity when an access network is connected to a core network through a secure gateway ePDG according to the local address of the user equipment.

Embodiment 7

Figure 15:
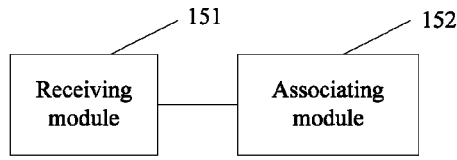
FIG. 15 is a structural schematic diagram of an apparatus for associating sessions according to a seventh embodiment of the present invention.

Corresponding to the preceding method embodiments, this embodiment further provides an apparatus for associating sessions. Specifically, as shown in FIG. 15, the apparatus for associating sessions in this embodiment includes:

a receiving module 151, configured to receive a first policy control session establishment request or a first policy control session modification request that carries a local address of a user equipment; and an associating module 152, configured to associate the first policy control session and a second policy control session corresponding to the first policy control session according to the local address of the user equipment;

where, the local address is allocated by a non-third generation partnership project 3GPP access network.

For different network scenarios, the apparatus for associating sessions in this embodiment may be implemented by using the following methods:

Method 1:

If the first policy control session establishment request received by the receiving module 151 is an IP connectivity access network IP-CAN session establishment request, or the first policy control session modification request is an IP-CAN session modification request, then:

the associating module 152 is specifically configured to associate the IP-CAN session and a gateway control session or an S9* session corresponding to the IP-CAN session according to the local address.

Further, the receiving module 151 may further be configured to receive an S9* session initiated by the non-3GPP access network, where the S9* session carries the local address.

Method 2:

If the first policy control session establishment request received by the receiving module 151 is a first gateway control session establishment request initiated by an evolved packet data gateway ePDG, then:

the associating module 152 is specifically configured to associate the first gateway control session and a second gateway control session corresponding to the first gateway control session, where the second gateway control session is a gateway control session initiated by a non-third-generation partnership project 3GPP access network.

Further, if the first gateway control session establishment request received by the receiving module 151 further carries IP connectivity information of the user equipment, where the IP connectivity information includes a care-of address CoA, or a subscriber identity and a packet data network PDN identity of the user equipment, then the associating module 152 is further configured to associate the first gateway control session and an IP-CAN session corresponding to the first gateway control session, thereby associating the second gateway control session and the IP-CAN session.

Method 3:

If the first policy control session establishment request received by the receiving module 151 is an S9* session establishment request initiated by a policy control and charging rules function PCRF, then:

the associating module 152 is specifically configured to associate the S9* session and a remote authentication dial-in user service RADIUS session or a diameter session initiated by a broadband remote access server BRAS corresponding to the S9* session.

According to the apparatus for associating sessions provided in the embodiment of the present invention, the local address of the user equipment is carried in the policy control session, so that different policy control sessions of a same user equipment may be associated according to the local address to ensure that the service policies followed by different sessions of the same user equipment are consistent. The solution provided in the embodiment of the present invention may implement correct association between different policy control sessions but do not rely on information of the user equipment such as an HoA/CoA address or a PDN identity when an access network is connected to a core network through a secure gateway ePDG according to the local address of the user equipment.

Embodiment 8

Figure 16:
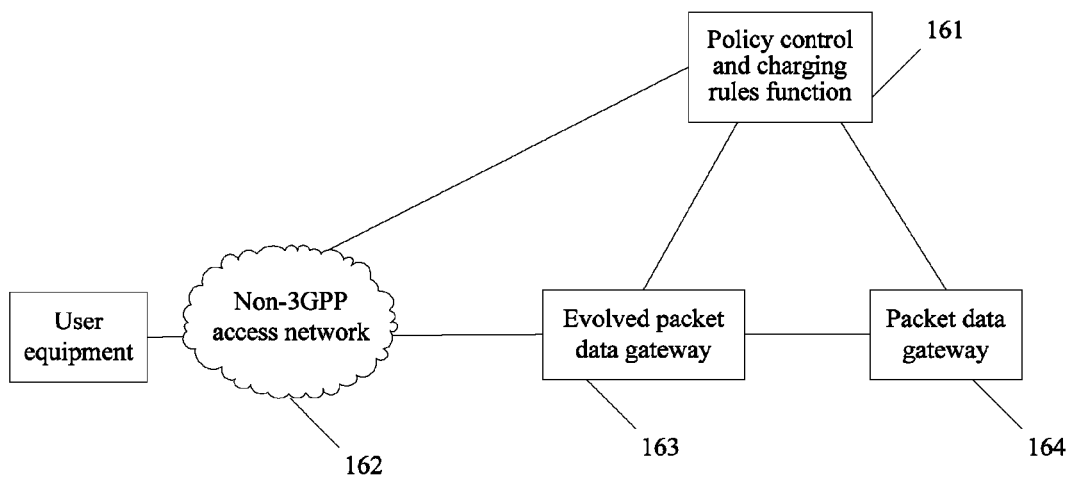
FIG. 16 is a structural schematic diagram of a system for associating sessions according to an eighth embodiment of the present invention.

As shown in FIG. 16, a system for associating sessions provided in this embodiment includes a policy control and charging rules function (PCRF) 161; where, the policy control and charging rules function 161 is configured to receive a first policy control session establishment request or a first policy control session modification request that carries a local address of a user equipment, and associate the first policy control session and a second policy control session corresponding to the first policy control session according to the local address of the user equipment;

where, the local address is allocated by a non-third generation partnership project 3GPP access network.

For different network scenarios, the system for associating sessions in this embodiment may further be implemented by using the following methods:

Method 1:

If the first policy control session is an IP connectivity access network IP-CAN session, and the second policy control session is a gateway control session or an S9* session, then:

As shown in FIG. 16, the system for associating sessions in this embodiment further includes: a non-third-generation partnership project 3GPP access network 162, an evolved packet data gateway (ePDG) 163, and a packet data gateway (PGW) 164; where, the non-3GPP access network 162 is configured to send the gateway control session establishment request to the PCRF 161, where the request carries the local address of the user equipment; in certain specific scenarios, network entities in the non-3GPP access network 162 may also send S9* sessions that carry the local address of the user equipment to the PCRF 161;

the ePDG 163 is configured to send a proxy binding update message or a binding update message to the PGW 164, where the message includes the local address of the user equipment; and the PGW 164 is configured to receive the proxy binding update message or binding update message, and send an IP-CAN session establishment request or an IP-CAN session modification request that carries the local address of the user equipment to the PCRF 161.

Method 2:

If the first policy control session is a first gateway control session initiated by the ePDG, and the second policy control session is a second gateway control session initiated by the non-3GPP access network, then:

The system for associating sessions in this embodiment further includes: a non-3GPP access network 162 and an evolved packet data gateway (ePDG) 163; where, the non-3GPP access network 162 is configured to send the second gateway control session establishment request to the PCRF 161, where the request carries the local address of the user equipment; and the ePDG 163 is configured to send the first gateway control session establishment request that carries the local address of the user equipment to the PCRF 161.

In addition, if the first gateway control session establishment request further carries IP connectivity information of the user equipment, where the IP connectivity information includes a care-of address CoA, or a subscriber identity and a packet data network PDN identity of the user equipment, then:

The system for associating sessions further includes a packet data gateway (PGW) 164; where, the PGW 164 is configured to send an IP-CAN session establishment request or an IP-CAN session modification request that carries IP connectivity information of the user equipment to the PCRF 161; and The PCRF 161 is further configured to associate the first gateway control session and an IP-CAN session corresponding to the first gateway control session according to the IP connectivity information of the user equipment, thereby associating the second gateway control session and the IP-CAN session.

According to the system for associating sessions provided in the embodiment of the present invention, the local address of the user equipment is carried in the policy control session, so that different policy control sessions of a same user equipment may be associated according to the local address to ensure that the service policies followed by different sessions of the same user equipment are consistent. The solution provided in the embodiment of the present invention may implement correct association between different policy control sessions but do not rely on information of the user equipment such as an HoA/CoA address or a PDN identity when an access network is connected to a core network through a secure gateway ePDG according to the local address of the user equipment.

Embodiment 9

Figure 17:
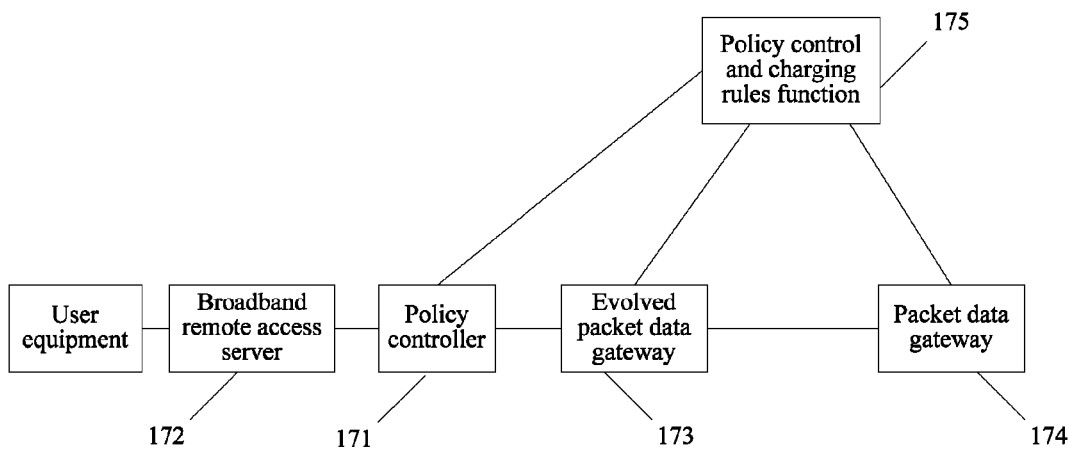
FIG. 17 is a structural schematic diagram of a system for associating sessions according to a ninth embodiment of the present invention.

As shown in FIG. 17, the system for associating sessions provided in this embodiment includes a non-third generation partnership project 3GPP access network, where the non-3GPP access network includes a policy controller PC 171; where, the PC 171, configured to receive an S9* session establishment request that carries a local address of a user equipment, and associate the S9* session and a remote authentication dial in user service RADIUS session or a diameter session corresponding to the first policy control session according to the local address of the user equipment;

where, the local address is allocated by a non-third generation partnership project 3GPP access network.

For different network scenarios, the system for associating sessions in this embodiment may further be implemented by using the following methods:

Method 1:

In the system for associating sessions in this embodiment, in addition to the policy controller PC 171, a broadband remote access server BRAS 172, an evolved packet data gateway ePDG 173, a packet data gateway PGW 174, and a policy control and charging rules function PCRF 175 are further included; where, the BRAS 172 is configured to send the RADIUS session or diameter session that carries the local address of the user equipment to the PC 171;

the PGW 174 is configured to receive the proxy binding update message or binding update message sent by the ePDG 173, where the local address of the user equipment is included in the message, and send an IP connectivity access network IP-CAN session establishment request or an IP-CAN session modification request that carries the local address to the PCRF 175; and the PCRF 175 is configured to extract the local address of the user equipment from the IP-CAN session establishment request or IP-CAN session modification request, and send an S9* session establishment request that carries the local address to the PC 171.

Method 2:

In the system for associating sessions in this embodiment, in addition to the policy controller PC 171, the BRAS 172, ePDG 173, and PCRF 175 are further included; where, the BRAS 172 is configured to send the RADIUS session or diameter session that carries the local address of the user equipment to the PC;

the ePDG 173 is configured to send a gateway control session establishment request that carries the local address and IP connectivity information of the user equipment to the PCRF 175, where the IP connectivity information includes a subscriber identity and a packet data network PDN identity of the user equipment; and the PCRF 175 is configured to receive the gateway control session establishment request, associate the gateway control session and an IP-CAN session corresponding to the gateway control session according to the IP connectivity information to match the IP-CAN session and the local address, and send an S9* session establishment request that carries the local address to the PC.

According to the system for associating sessions provided in the embodiment of the present invention, the local address of the user equipment is carried in the policy control session, so that different policy control sessions of a same user equipment may be associated according to the local address to ensure that the service policies followed by different sessions of the same user equipment are consistent. The solution provided in the embodiment of the present invention may implement correct association between different policy control sessions but do not rely on information of the user equipment such as an HoA/CoA address or a PDN identity when an access network is connected to a core network through a secure gateway ePDG according to the local address of the user equipment.

Based on descriptions in the preceding embodiments, a person skilled in the art may clearly understand that the present invention may be implemented through software by combining a necessary hardware platform, or entirely through hardware. Based on such understanding, the technical solutions in the present invention may be entirely or the part that contributes to the prior art may be embodied in the form of a software product. The computer software product is stored in a storage medium, such as ROM/RAM, magnetic disk, and compact disk, and includes several instructions that are used for a computer device (which may be a personal computer, server, or network device, and so on) to execute the method provided in each embodiment of the present invention or described in certain parts of the embodiments.

In conclusion, the above are merely specific implementation modes of the present invention. However, the scope of the present invention is not limited thereto. Changes or replacements readily apparent to a person skilled in the prior art within the technical scope of the present invention should fall within the scope of the present invention. Therefore, the protection scope of the present invention shall be subject to the appended claims.

What is claimed is:

1. A method for associating sessions, comprising:
  receiving, by an apparatus operable to provide a policy control and charging rules function (PCRF), an IP connectivity access network (IP-CAN) session establishment request from a packet data gateway (PGW), wherein the IP-CAN session establishment request carries a local address of a user equipment, and the local address of the user equipment is an IP address or an IP address prefix;
  receiving, by a policy controller (PC) that is in a non-3GPP access network comprising a broadband remote access server (BRAS), a remote authentication dial-in user service (RADIUS) session establishment request or a diameter session establishment request that carries the local address from the BRAS; and
  sending by the PC the S9* session establishment request to the apparatus;
  receiving, by the apparatus, an S9* session establishment request from the PC, wherein the S9* session establishment request carries the local address of the user equipment; and
  associating, by the apparatus, an IP-CAN session and an S9* session according to the local address of the user equipment.

2. The method according to claim 1, wherein the local address of the user equipment is allocated by the non-3GPP access network.

3. The method according to claim 1, wherein the non-3GPP access network is an untrusted non-3GPP access network.

4. The method according to claim 1, wherein before receiving the IP-CAN session establishment request from the PGW, the method further comprises:
  receiving, by the PGW, one of a proxy binding update message, a binding update message, and a create session request message, each of which comprises the local address of the user equipment, from an evolved packet data gateway (ePDG);
  sending, by the PGW, the IP-CAN session establishment request that carries the local address of the user equipment to the apparatus.

5. The method according to claim 4, wherein before receiving one of the proxy binding update message, the binding update message, and the create session request message from the ePDG, the method further comprises:
  establishing a secure tunnel between the user equipment and the ePDG, and acquiring, by the ePDG, the local address of the user equipment during a procedure for establishing the secure tunnel; wherein, the local address of the user equipment is allocated by a broadband remote access server (BRAS) in the non-3GPP access network.

6. The method according to claim 5, wherein after the establishing the secure tunnel between the user equipment and the ePDG, the method further comprises:
  receiving, by the ePDG, a binding update message, from the user equipment, wherein the binding update message carries a care-of address (CoA) of the user equipment; and
  adding, by the ePDG, the local address corresponding to the CoA address to the received binding update message, and sending the binding update message that carries the local address to the PGW.

7. A system for associating sessions, comprising:
  a packet data gateway (PGW);
  an apparatus operable to provide a policy control and charging rules function (PCRF), configured to receive an IP connectivity access network (IP-CAN) session establishment request from the PGW, wherein the IP-CAN session establishment request carries a local address of a user equipment, and the local address of the user equipment is an IP address or an IP address prefix; receive an S9* session establishment request from a policy controller (PC) that is in a non-3GPP access network, wherein the S9* session establishment request carries the local address of the user equipment, and associate an IP-CAN session and an S9* session according to the local address of the user equipment; and
  an evolved packet data gateway (ePDG), configured to send a proxy binding update message or a binding update message to the PGW, each of which comprises the local address of the user equipment.

8. The system according to claim 7, wherein the local address of the user equipment is allocated by the non-3GPP access network.

9. The system according to claim 7, wherein the non-3GPP access network is an untrusted non-3GPP network.

* * * * *